(12) United States Patent
Johnson et al.

(10) Patent No.: US 12,266,385 B2
(45) Date of Patent: *Apr. 1, 2025

(54) DATA STORAGE DEVICE HAVING DUAL ACTUATORS AND METHOD FOR EMERGENCY POWER OFF RETRACT (EPOR) OF DUAL ACTUATORS

(71) Applicant: Western Digital Technologies, Inc., San Jose, CA (US)

(72) Inventors: Brian Johnson, Laguna Hills, CA (US); Jaesoo Byoun, Irvine, CA (US); Gaku Ikedo, Fujisawa (JP); Hideaki Ito, Fujisawa (JP); Naoyuki Kagami, Fujisawa (JP); Hiroki Watanabe, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,637

(22) Filed: Aug. 9, 2023

(65) Prior Publication Data

US 2023/0386513 A1 Nov. 30, 2023

Related U.S. Application Data

(62) Division of application No. 17/716,312, filed on Apr. 8, 2022, now Pat. No. 11,763,844.

(51) Int. Cl.
*G11B 5/55* (2006.01)
*G11B 5/48* (2006.01)

(52) U.S. Cl.
CPC .......... *G11B 5/5578* (2013.01); *G11B 5/4813* (2013.01); *G11B 5/5573* (2013.01)

(58) Field of Classification Search
None
See application file for complete search history.

(56) References Cited

U.S. PATENT DOCUMENTS

| | | |
|---|---|---|
| 4,658,308 A | 4/1987 | Sander, Jr. |
| 4,786,995 A | 11/1988 | Stupeck et al. |
| 4,831,469 A | 5/1989 | Hanson et al. |
| 5,223,993 A | 6/1993 | Squires et al. |
| 5,969,899 A | 10/1999 | Utenick et al. |
| 6,025,968 A | 2/2000 | Albrecht |
| 6,396,652 B1 | 5/2002 | Kawachi et al. |

(Continued)

OTHER PUBLICATIONS

Ex Parte Quayle Action received for U.S. Appl. No. 17/716,296 dated Jun. 20, 2023, 8 pages.

(Continued)

*Primary Examiner* — William J Klimowicz
(74) *Attorney, Agent, or Firm* — NOD Law PC

(57) ABSTRACT

A data storage device comprises a lead actuator that actuates a first read-write head over a first disk and a support actuator that actuates a second read-write head over a second disk. A spindle motor rotates the first and second disks. In response to an emergency power off (EPO) event, a processing device retracts and parks the actuators using an internal supply voltage generated from a back electromotive force (BEMF) voltage of the spindle motor, and brakes the spindle motor. The spindle motor is not braked until both the lead and support actuators have been retracted and parked.

20 Claims, 13 Drawing Sheets

(56) References Cited

U.S. PATENT DOCUMENTS

| | | | |
|---|---|---|---|
| 6,567,232 B1 | 5/2003 | Klaassen | |
| 6,594,102 B1 | 7/2003 | Kanda et al. | |
| 6,636,374 B1 | 10/2003 | Goh et al. | |
| 6,937,427 B2* | 8/2005 | Tan | G11B 5/5521 |
| | | | 360/78.04 |
| 7,274,529 B2 | 9/2007 | Ho et al. | |
| 8,924,641 B2 | 12/2014 | Trantham et al. | |
| 9,230,593 B1* | 1/2016 | Nicholls | G11B 19/20 |
| 9,940,958 B1 | 4/2018 | Kiyonaga et al. | |
| 9,972,348 B1 | 5/2018 | Ferris et al. | |
| 9,997,182 B1 | 6/2018 | Tanner et al. | |
| 10,014,018 B1 | 7/2018 | Kiyonaga et al. | |
| 10,152,994 B1 | 12/2018 | Capretta et al. | |
| 10,714,133 B1 | 7/2020 | Johnson et al. | |
| 11,763,844 B1* | 9/2023 | Johnson | G11B 5/5578 |
| | | | 360/264.2 |
| 2002/0006007 A1 | 1/2002 | Ataee | |
| 2002/0074963 A1 | 6/2002 | White et al. | |
| 2002/0141102 A1 | 10/2002 | Kusumoto | |
| 2005/0207067 A1 | 9/2005 | Zabtcioglu | |
| 2013/0070363 A1* | 3/2013 | Bennett | G11B 19/041 |
| | | | 360/73.03 |
| 2020/0082846 A1 | 3/2020 | Sakamoto et al. | |
| 2021/0004327 A1 | 1/2021 | DeClercq et al. | |
| 2023/0326484 A1* | 10/2023 | Johnson | G11B 5/4813 |
| | | | 360/264.7 |

OTHER PUBLICATIONS

Nair et al., "Reconfigurable Control as Actuator Fault-Tolerant Control Design for Power Oscillation Damping", Nair and Murty Protection and Control of Modern Power Systems, 5(8), 12 pages, 2020.

Non-Final Office Action received for U.S. Appl. No. 17/716,312 dated Jan. 10, 2023, 11 pages.

Notice of Allowance received for U.S. Appl. No. 17/716,296 dated Aug. 10, 2023, 16 pages.

Notice of Allowance received for U.S. Appl. No. 17/716,312 dated May 8, 2023, 10 pages.

Requirement for Restriction received for U.S. Appl. No. 17/716,312 dated Dec. 8, 2022, 7 pages.

* cited by examiner

DATA STORAGE DEVICE HAVING DUAL ACTUATORS AND METHOD FOR EMERGENCY POWER OFF RETRACT (EPOR) OF DUAL ACTUATORS

CLAIM OF PRIORITY UNDER 35 U.S.C. 4119

The present application for patent is a division of U.S. patent application Ser. No. 17/716,312 entitled "DATA STORAGE DEVICE HAVING DUAL ACTUATORS AND METHOD FOR EMERGENCY POWER OFF RETRACT (EPOR) OF DUAL ACTUATORS" filed Apr. 8, 2022, and assigned to the assignee hereof and hereby expressly incorporated by reference herein.

BACKGROUND

Data storage devices such as hard disk drives (HDDs) comprise one or more disks, and one or more magnetic read/write heads connected to distal ends of actuator arms that are rotated by actuators such as voice coil motors (VCMs) to position the heads radially over surfaces of the disks at carefully controlled fly heights over the disk surfaces. The disk surfaces comprise a plurality of radially spaced, concentric servo tracks for recording user data sectors, and a plurality of servo sectors or wedges. The servo tracks are written on previously blank disk drive surfaces as part of the final stage of preparation of the disk drive. The servo sectors comprise head positioning information that is read by the heads and processed by a servo control system to control the actuator arms as they seek from track to track.

The discs are typically rotated by a spindle motor at high speed such that an air bearing forms between the head and the disk surface. During operation of the disk drive, a power interruption or failure may sometimes occur, which is termed an emergency power off (EPO) event. During an EPO event, the momentum of the disk spinning generates a back electromotive force (BEMF) voltage across the windings of the spindle motor that may be used to generate an internal supply voltage to assist with power down operations. Importantly, the heads should be parked before the air bearing dissipates to prevent damage to the heads and/or the disks, such as by unloading the heads onto a ramp near the outer diameter of the disk. Once the heads are parked, a spin-down operation is conducted in which the spindle motor is braked to stop it from rotating as quickly as possible to minimize head wear. The internal supply voltage generated from the BEMF needs to be managed carefully to support the head parking function, as well as other operations the disk drive may need to perform in a power loss situation, such as egressing cached write data to a non-volatile semiconductor memory.

Development and implementation of various means for increasing HDD performance is ongoing. One approach to increasing HDD performance is the implementation of multi-actuator systems, in which multiple actuators independently and concurrently read to and write from multiple disks of a disk stack. Disk drive operations associated with an EPO event, such as head parking and data egress functions, become more complex in the context of a multi-actuator system.

SUMMARY

Various aspects disclosed herein provide data storage devices, systems, and methods for emergency power off retract (EPOR) in a data storage device having dual actuators.

One aspect of this disclosure is a data storage device comprising a lead actuator configured to actuate at least a first read-write head over at least a first disk, and a support actuator configured to actuate at least a second read-write head over at least a second disk. A spindle motor is configured to rotate the first and second disks. One or more processing devices are configured, in response to an emergency power off (EPO) event, to retract and park the lead and support actuators using an internal supply voltage generated from a back electromotive force (BEMF) voltage of the spindle motor, and to brake the spindle motor. The spindle motor is not braked until both the lead and support actuators have been retracted and parked.

Another aspect of this disclosure is a method in which a lead actuator actuates at least a first read-write head over at least a first disk, and a support actuator actuates at least a second read-write head over at least a second disk. A spindle motor rotates the first and the second disks. In response to an emergency power off (EPO) event, one or more processing devices control the lead and support actuators to retract and park using an internal supply voltage generated from a back electromotive force (BEMF) voltage of the spindle motor and control the spindle motor to brake. The spindle motor is not controlled to brake until both the lead and support actuators have been retracted and parked.

A further aspect of this disclosure is a data storage device comprising a lead voice control motor (VCM) configured to actuate a first read-write head over a first disk, and a support VCM configured to actuate a second read-write head over a second disk. A spindle motor is configured to rotate the first and second disks. Means for retracting and parking the lead and support VCMs in response to an emergency power off (EPO) event and means for braking the spindle motor in response to the EPO event are provided. The spindle motor is not braked until both the lead and support actuators are retracted and parked.

Various additional aspects of this disclosure are depicted and described in the accompanying drawings and the following description.

BRIEF DESCRIPTION OF THE DRAWINGS

Various features and advantages of this disclosure will be apparent from the following description and accompanying drawings. The drawings are not necessarily to scale; emphasis instead is placed on illustrating the principles of this disclosure. In the drawings, like reference characters may refer to the same parts throughout the different figures. The drawings depict illustrative examples of this disclosure and are not limiting in scope.

DETAILED DESCRIPTION

Figure 1:
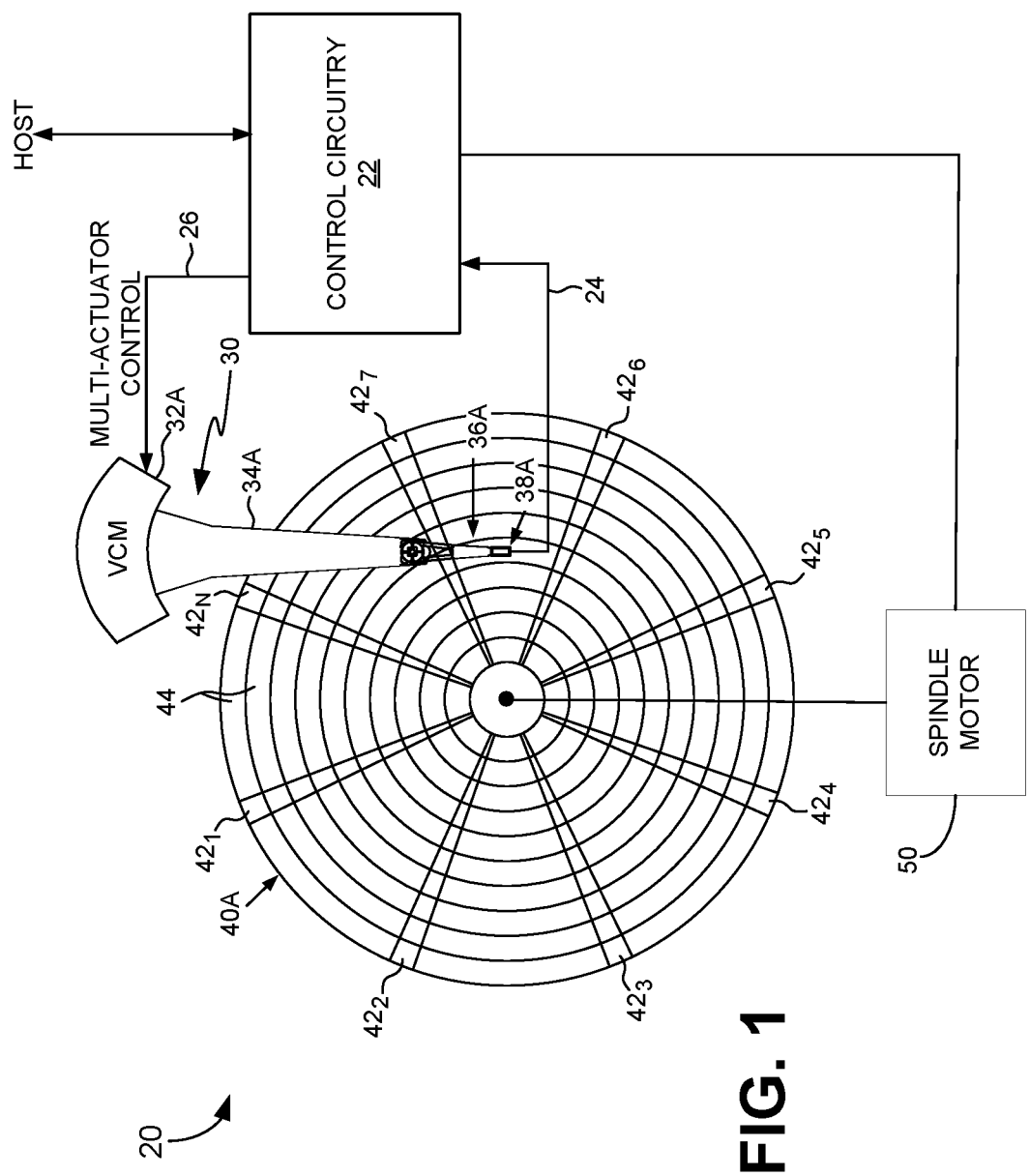
FIG. 1 is a conceptual top view of a data storage device in the form of a disk drive having a dual actuator assembly, according to aspects of this disclosure.
Figure 2:
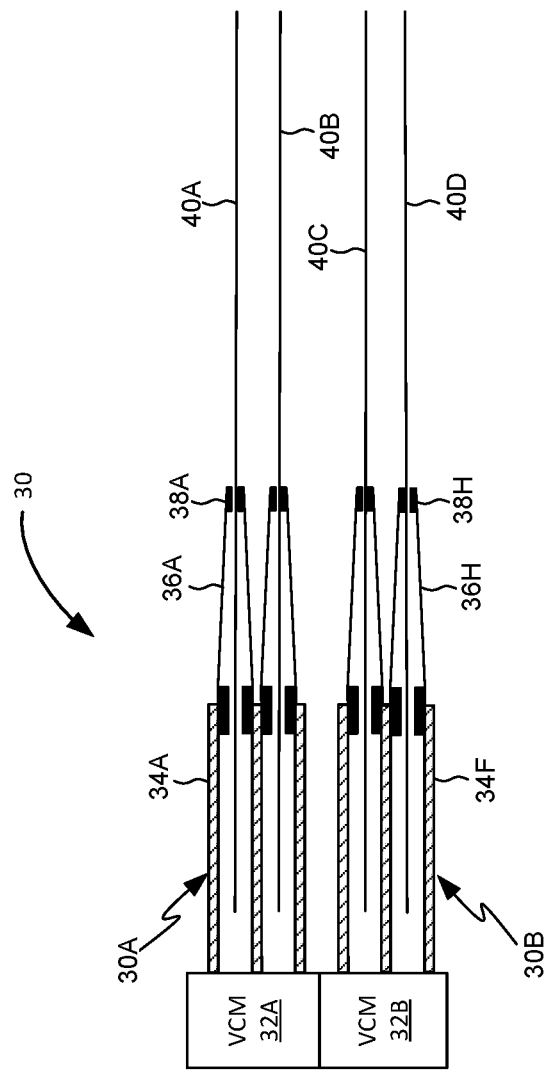
FIG. 2 is a side view of the dual actuator assembly of FIG. 1, according to aspects of this disclosure.

FIG. 1 is a conceptual top view of a data storage device in the form of a hard disk drive (HDD) 20 having a dual actuator assembly 30, in accordance with aspects of this disclosure. FIG. 2 is a conceptual side view of dual actuator assembly 30, in accordance with aspects of this disclosure. Dual actuator assembly 30 is configured to write data to and read data from one or more disks 40 of disk drive 20 in response to multi-actuator control signals 26 from control circuitry 22. Control circuitry 22 may comprise one or more processing devices such as power large scale integrated circuits (PLSIs), as will be explained in more detail herein.

For non-limiting purposes of illustration, disk drive 20 is shown in FIG. 2 as having a first disk stack comprising first disks 40A and 40B and a second disk stack comprising second disks 40C and 40B. However, disk drive 20 may include any suitable number of disks and stacks of disks. Disk drive 20 further comprises a spindle motor 50 that rotates a spindle on which disks 40 are rotatably mounted. Spindle motor 50 comprises a plurality of windings and a rotor that is rotatable at a variable spin rate.

Dual actuator assembly 30 comprises a lead (first) actuator assembly 30A and a support (second) actuator assembly 30B. Each of lead and support actuator assemblies 30A and 30B comprises an actuator configured to actuate at least one magnetic read-write head (also referred to as a transducer) over a disk. As shown in FIG. 2, for example, lead actuator assembly 30A comprises lead (first) actuator 32A configured to actuate first read-write heads 38A-38D over top and bottom surfaces of first disks 40A and 40B, and support actuator assembly 30B comprises support (second) actuator 32B configured to actuate second read-write heads 38E-38H over top and bottom surfaces of second disks 40C and 40D. In one embodiment, as shown in FIGS. 1 and 2, lead and support actuators 32A and 32B are voice coil motors (VCMs).

The heads 38A-38H of actuator assemblies 30A and 30B are configured at distal ends of actuator arms 34A-34F via suspensions 36A-36H. Actuator arms 34 and suspensions 36 are configured to suspend read-write heads 38 in close proximity over a corresponding disk surface. The numbers of actuators, actuator arms, suspensions, heads, and disks shown in FIG. 2 are for non-limiting purposes of illustration only. Disk drive 20 may comprise other numbers of actuators, actuator arms, suspensions, heads, and disks than those shown in FIG. 2. Lead actuator 32A and support actuator 32B may rotate their respective actuator arms about a common pivot in what may be referred to as a split actuator design. Alternatively, lead and support actuators 32A and 32B may be separated to rotate their respective actuator arms about independent pivots.

Each disk 40 comprises a plurality of servo sectors (e.g., $42_1$-$42_N$) that define a plurality of servo tracks 44, wherein data tracks are defined relative to servo tracks 44 at the same or different radial density. Control circuitry 22 processes a read signal 24 emanating from a respective one of heads 38 (e.g., head 38A in FIG. 1) to demodulate the servo sectors and generate a position error signal (PES) representing an error between the actual position of the head 38 and a target position relative to a target track 44. A servo control system in control circuitry 22 filters the PES using a suitable compensation filter to generate control signal 26 applied to lead actuator 32A or support actuator 32B of dual actuator assembly 30, which in turn rotates one of actuator arms 34 about a pivot to actuate the head radially over the disk in a direction that reduces the PES. The servo sectors may comprise any suitable head position information, such as a track address for coarse positioning and servo bursts for fine positioning. The servo bursts may comprise any suitable pattern, such as an amplitude-based servo pattern or a phase-based servo pattern.

Disks 40 are rotated by spindle motor 50 at high speed such that an air bearing forms between heads 38 and the surfaces of disk 40. The rotor of spindle motor 50 generates a back electromotive force (BEMF) voltage across the windings that is proportional to the spin rate of the motor. During operation of disk drive 20, a power interruption or failure may sometimes occur, which is termed an emergency power off (EPO) event. During an EPO event, it is important that heads 38 be parked before the air bearing dissipates to prevent damage to heads 38 and/or disk 40, such as by unloading heads 38 onto a ramp near the outer diameter of disks 40. The BEMF voltage across the windings of spindle motor 50 may be used to generate an internal supply voltage Vpwr that is used to park heads 38 in response to an EPO event. The internal supply voltage Vpwr generated by the BEMF voltage needs to be managed carefully to support the head parking function, as well as other operations the disk drive may need to perform in such a situation, such as egressing cached write data from a volatile semiconductor memory, such as dynamic random-access memory (DRAM), to a non-volatile semiconductor memory, such as flash memory.

The internal supply voltage Vpwr may be generated from the BEMF voltage in any suitable manner. In one example, the internal supply voltage Vpwr may be generated through a synchronous rectification technique in which the BEMF voltage is rectified to generate the internal supply voltage Vpwr. In another example, a boost/brake technique (BBS) may be employed that periodically shorts the spindle motor windings to boost the BEMF voltage when generating the internal supply voltage Vpwr. The internal supply voltage Vpwr may be generated using a combination of these techniques, for example, by initially using synchronous rectification and then switching to BBS when Vpwr falls below a threshold.

Control circuitry 22 is configured to conduct the emergency power off (EPO) procedure for disk drive 20. The EPO procedure for a single actuator configuration is relatively straightforward: the control circuitry waits for the actuator (VCM) to finish retracting and parking the head before braking the spindle motor. In the dual actuator configuration of this disclosure, however, there are additional complexities that must be addressed. Two (or more) actuators 32A and 32B must safely retract and park their associated heads before braking spindle motor 50. A problematic scenario arises if one actuator finishes retracting and moves to the spindle brake state (which stops generating power from spindle motor 50) before the second actuator has finished retracting. In this scenario, the second actuator may land its heads on the disk before they are parked because there is no longer any energy being generated by the BEMF of spindle motor 50 to power VCM retract. Moreover, if data egress is enabled, the energy consumed by the egress could load down the system too much to allow the second actuator to finish retracting and parking its head. Even in a single actuator configuration, conducting egress before parking is complete can trip the final threshold (Uv_vpwr) at which insufficient power remains to retract and park the heads or to egress data.

Figure 3:
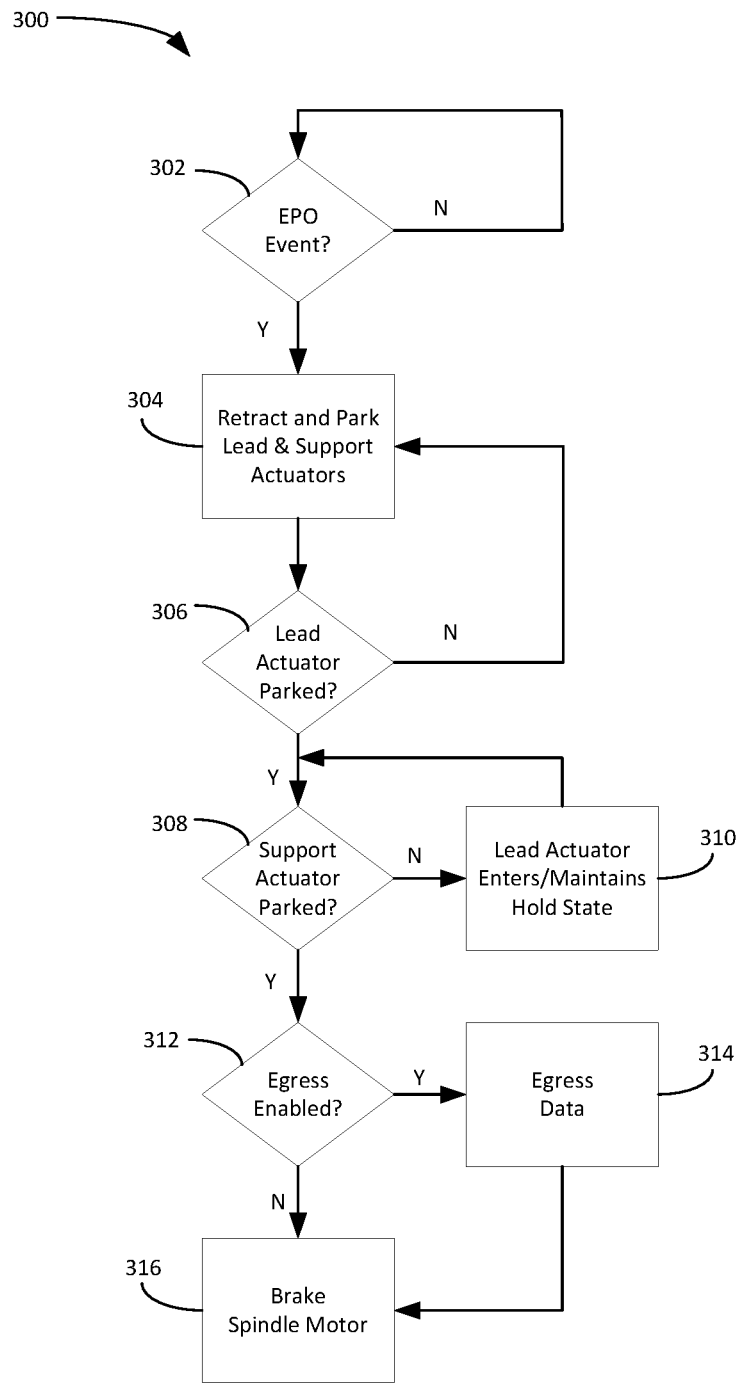
FIG. 3 is a flowchart illustrating an EPO retract (EPOR) procedure performed by control circuitry of the disk drive for a dual actuator configuration, according to aspects of this disclosure.

FIG. 3 is a flowchart illustrating an EPO retract (EPOR) procedure 300 performed by control circuitry 22 for a dual actuator configuration according to this disclosure. In step 302, control circuitry 22 detects whether an EPO event has occurred. In one non-limiting example, an EPO event occurs when the internal supply voltage Vpwr generated by the BEMF voltage across the windings of spindle motor 50 falls below an EPO voltage threshold (UVwarn12). If an EPO event is detected, control circuitry 22 initiates retraction of lead actuator 32A and support actuator 32B in step 304. In step 306, control circuitry 22 determines whether lead actuator 32A has finished retracting and is parked. If lead actuator 32A has not finished retracting and parking, retraction of the actuators continues (step 304).

Once it is determined that lead actuator 32A has finished retracting and is parked, control circuitry 22 determines in step 308 whether support actuator 32B has finished retracting and is parked. If support actuator 32B has not finished retracting, lead actuator 32A enters into a hold state (step 310) in which lead actuator 32A goes into tri state and spindle motor 50 is maintained in a spindle energy extraction state (i.e., BBS or synchronous rectification). Once support actuator 32B has finished retracting and is parked (i.e., both lead actuator 32A and support actuator 32B are parked), if data egress is enabled (step 312), data is egressed (step 314), and the spindle brake is applied when egress is finished (step 316). If data egress is not enabled, the spindle brake is applied after lead actuator 32A and support actuator 32B are parked.

EPO retract procedure 300 of FIG. 3 is implemented by control circuitry 22, which may comprise one or more processing devices. To implement retract procedure 300, control circuitry 22 may have either a single PLSI/dual actuator configuration (FIGS. 4A and 4B) or a dual PLSI/dual actuator configuration (FIG. 4C). These alternative configurations for implementing EPO retract procedure 300 are described in more detail below.

Figure 4A:
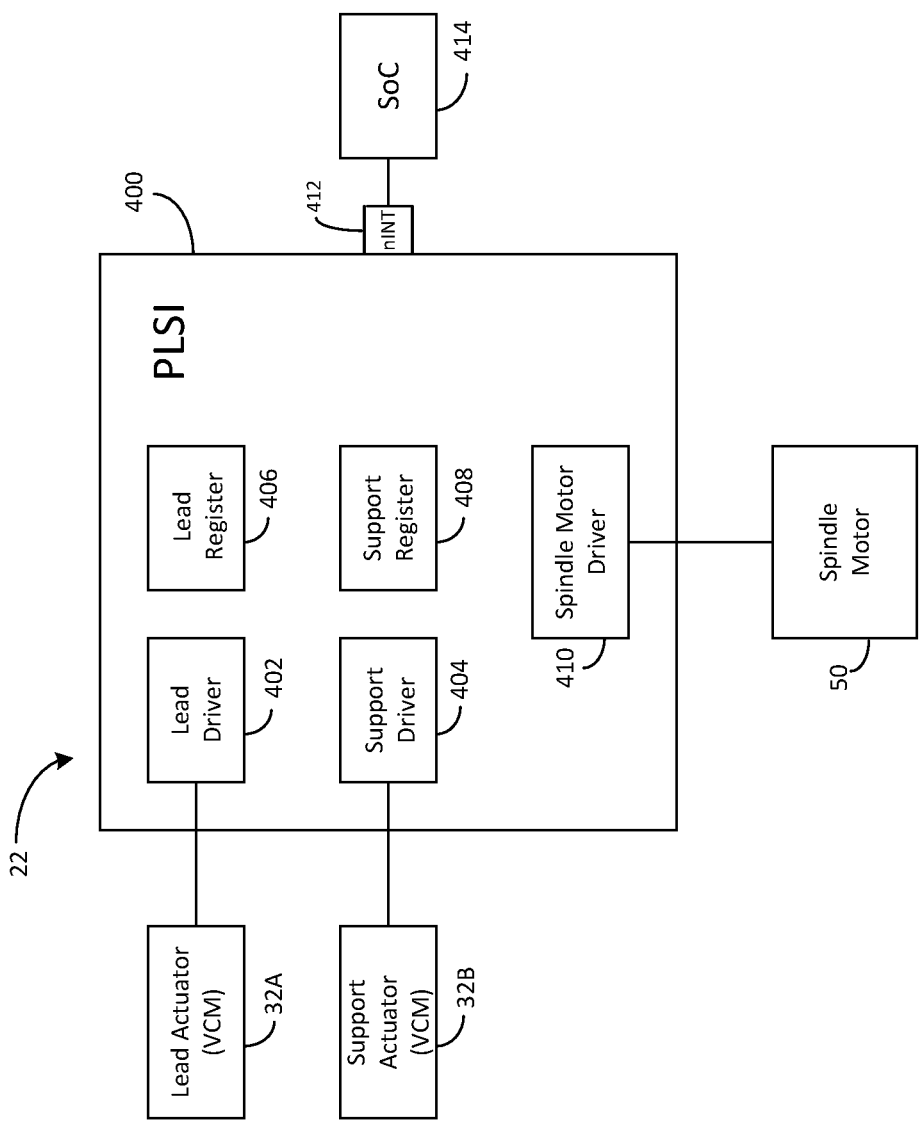
FIG. 4A is a conceptual block diagram illustrating a single PLSI/dual actuator configuration for implementing the EPOR procedure of FIG. 3, according to aspects of this disclosure.

According to one aspect of this disclosure, as shown in FIG. 4A, control circuitry 22 may comprise a single power large scale integrated circuit ("PLSI") 400 that is configured to drive both lead actuator 32A and support actuator 32B, and that implements EPOR procedure 300 of FIG. 3. PLSI 400 may comprise a lead driver 402 configured to drive lead actuator 32A, and a support driver 404 configured to drive support actuator 32B. PLSI 400 also comprises two sets of actuator registers—lead register 406 and support register 408—configured to indicate when retraction and parking of lead actuator 32A and support actuator 32B is complete. PLSI 400 may also comprise a spindle motor driver 410 configured to drive spindle motor 50.

Figure 4B:
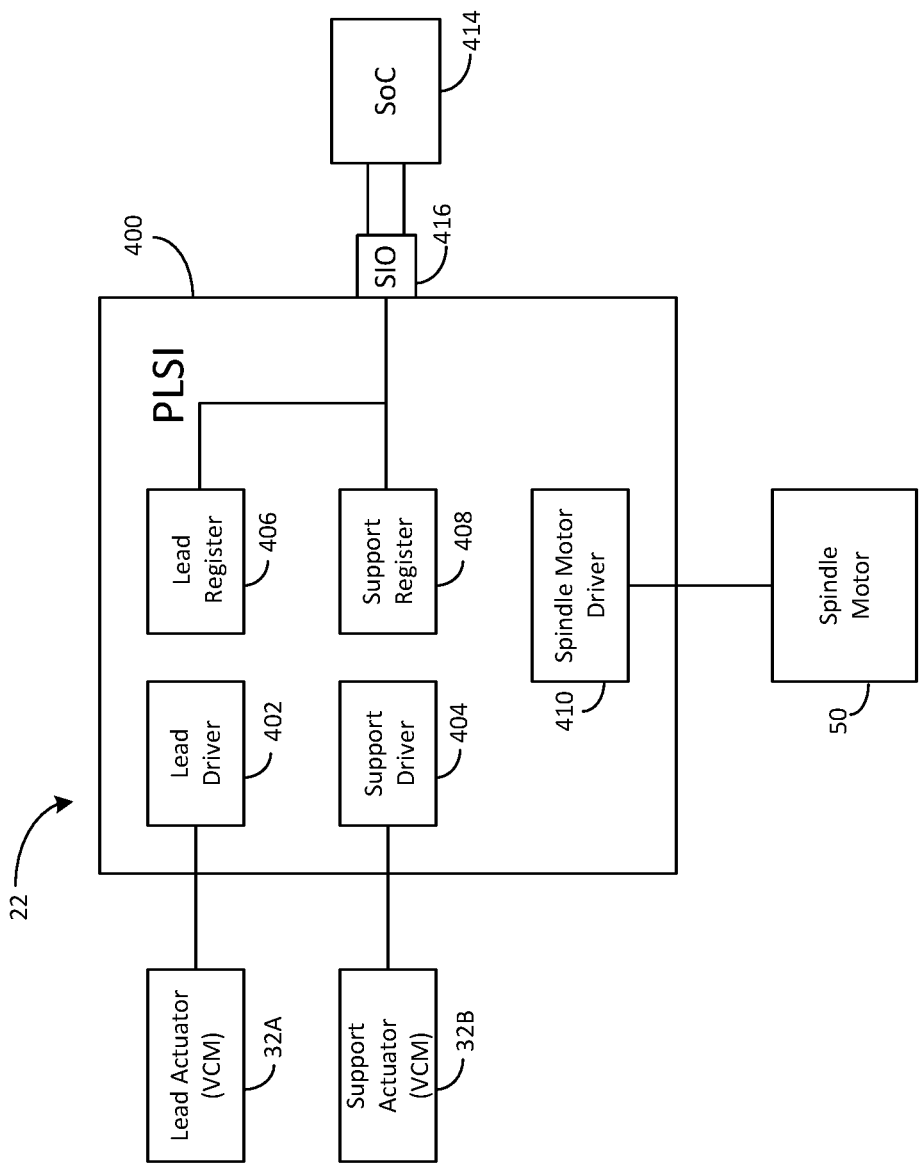
FIG. 4B is a conceptual block diagram illustrating an alternative single PLSI/dual actuator configuration for implementing the EPOR procedure of FIG. 3, according to aspects of this disclosure.
Figure 4C:
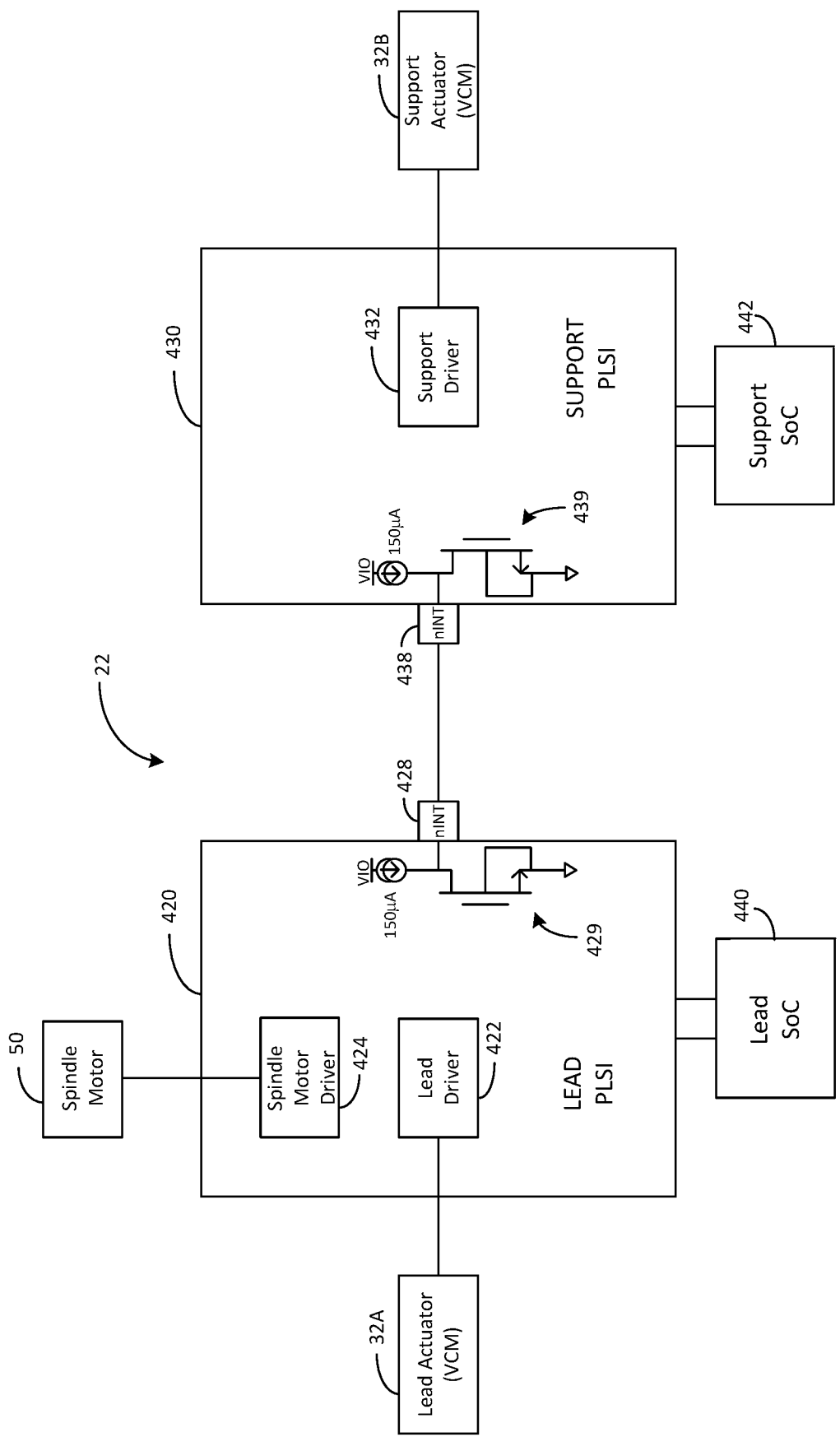
FIG. 4C is a conceptual block diagram illustrating a dual PLSI/dual actuator configuration for implementing the EPOR procedure of FIG. 3, according to aspects of this disclosure.

PLSI 400 may be configured to communicate with SoC 414 to initiate data egress. In one implementation, particularly when PLSI 400 is used in connection with egress throttling method 700 of FIG. 7 (described below), PLSI 400 may communicate with SoC 414 via nINT pin 412. Alternatively, however, communication between PLSI 400 and SoC 414 may be by means other than nINT pin 412. As shown in FIG. 4B, for example, SoC 414 may poll lead register 406 and support register 408 via serial input/output (SIO) port 416. In one implementation, SoC 414 may poll the Vpwr_Low_Status and D5V_Low_Status bits of registers 406 and 408. While PLSI 400 is shown for non-limiting purposes of illustration in FIGS. 4A and 4B as having two actuator drivers and two registers for driving two actuators, PLSI may alternatively be configured with more than two actuator drivers and registers for driving more than two actuators.

The EPOR procedure 300 of FIG. 3 is implemented by the single PLSI/dual actuator configuration of FIGS. 4A and 4B as follows. In response to detection of an EPO event in step 302, lead driver 402 drives lead actuator 32A to retract and park and support driver 404 drives support actuator 32B to retract and park (step 304). PLSI 400 checks lead register 406 to determine whether retraction and parking of lead actuator 32A is complete in step 306, and checks support register 408 to determine whether retraction and parking of support actuator 32B is complete in step 308. Based on the contents of registers 406 and 408, when lead actuator 32A has parked but support actuator 32B has not yet parked (step 308-N), lead actuator 32A may enter the hold state (step 310) while waiting for retraction and parking of support actuator 32B to complete. In the hold state, PLSI 400 moves lead actuator 32A into tri state and spindle motor 50 is maintained in a spindle energy extraction state (via BBS or synchronous rectification). Once registers 406 and 408 indicate that both lead actuator 32A and support actuator 32B are fully retracted and parked (step 308-Y), if data egress is not enabled (step 312-N), PLSI 400 proceeds to brake spindle motor 50 in step 316. If data egress is enabled (step 312-Y), PLSI 400 communicates with SoC (system on a chip) 414 to egress data (step 314) before braking spindle motor 50 in step 316.

According to another aspect of this disclosure, as shown in FIG. 4C, control circuitry 22 may comprise dual PLSIs configured to implement the EPOR procedure 300 of FIG. 3, where lead actuator 32A and support actuator 32B are each driven by their own dedicated PLSI. Control circuitry 22 may comprise, for example, a lead PLSI 420 having a lead driver 422 configured to drive lead actuator 32A, and a support PLSI 430 having a support driver 432 configured to drive support actuator 32B. In the dual PLSI/dual actuator configuration of FIG. 4C, lead PLSI 420 is responsible for transitioning to a spindle brake state and/or data egress state after lead actuator 32A and support actuator 32B have finished retracting and are parked. In this regard, lead PLSI 420 may also comprise a spindle motor driver 424 configured to drive spindle motor 50 and may be configured to communicate with lead SoC 440 to initiate data egress. Support PLSI 430 may be similarly configured to communicate with support SoC 442 for data egress. While two PLSIs 420 and 430 for driving two actuators are shown in FIG. 4C for non-limiting purposes of illustration, more than two PLSIs for driving more than two actuators may alternatively be provided.

Lead PLSI 420 further comprises lead nINT pin 428 that is coupled to the drain of lead metal oxide semiconductor field effect transistor (MOSFET) 429. Likewise, support PLSI 430 comprises support nINT pin 438 that is coupled to the drain of support MOSFET 439. When lead PLSI 420 is driving lead actuator 32A to retract and park in response to an EPO event, there is a hard pull down of lead nINT pin 428, pulling lead nINT pin 428 down to low or zero (open drain). Likewise, when support PLSI 430 is driving support actuator 32B to retract and park in response to an EPO event, there is a hard pull down of support nINT pin 438, pulling support nINT pin 438 down to low or zero. As shown in FIG. 4C, nINT pins 428 and 438 are tied together. Therefore, due to the hard pull-down, so long as either or both of PLSIs 420 and 430 are in a state of driving their respective actuators to retract, both nINT pins 428 and 438 will remain in a low state (zero). Once both PLSIs have finished retracting and parking their respective actuators, nINT pins 428 and 438 are both released and soft pulled up to a high state (one). Thus, a rising signal on the tied nINT pins indicates that both lead actuator 32A and support actuator 32B are parked, and that lead PLSI 420 may transition to the spindle brake and/or data egress state.

The EPOR procedure 300 of FIG. 3 is implemented by the dual actuator/dual PLSI configuration of FIG. 4C as follows. In response to detection of an EPO event in step 302, lead driver 422 of lead PLSI 420 drives lead actuator 32A to retract and park, and support driver 432 of support PLSI 430 drives support actuator 32B to retract and park (step 304). When lead PLSI 420 has finished retracting, it releases its nINT pin 428 (step 306-Y). However, if support PLSI 430 has not finished retracting, its nINT pin 438 remains low in a hard pull down, causing the tied nINT pins to remain low (step 308-N). In this situation, lead PLSI 420 moves to a hold state (step 310) and continues to monitor the tied nINT pins for a rising signal, which will indicate that retraction and parking of support actuator 32B is complete. In the hold state, lead PLSI 420 moves lead actuator 32A into tri state and spindle motor 50 is maintained in a spindle energy extraction state (via BBS or synchronous rectification). When both actuators 32A and 32B have finished retracting, both nINT pins 428 and 438 are released, and the signal on the tied nINT pins rises. When lead PLSI 420 detects the rising nINT pin signal (step 308-Y), if data egress is not enabled (step 312-N), lead PLSI 420 proceeds to brake spindle motor 50 in step 316. If data egress is enabled (step 312-Y), lead PLSI 420 communicates with lead SoC 440 and support PLSI 430 communicates with support SoC 442 to egress data (step 314) before braking spindle motor 50 in step 316.

Figure 5:
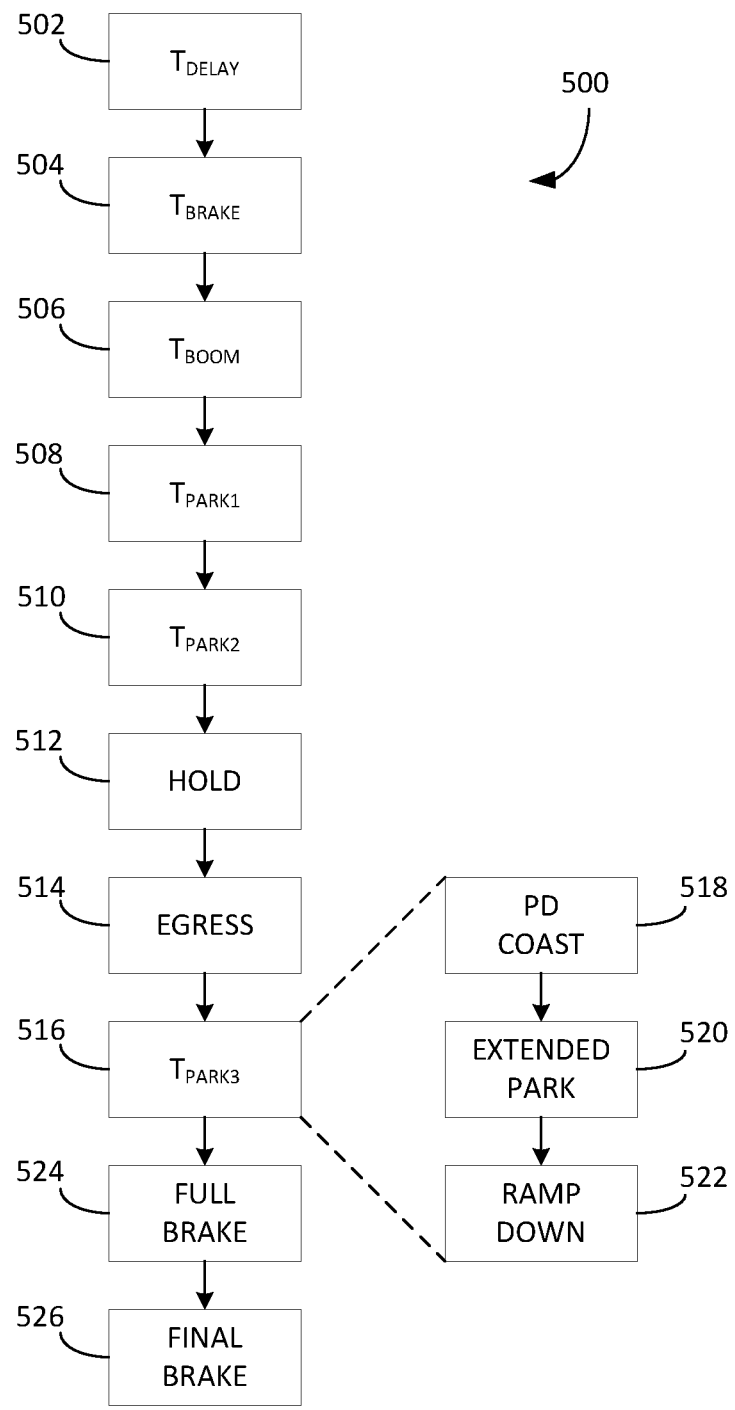
FIG. 5 is a flow chart showing the stages of the EPOR procedure of FIG. 3 in more detail, according to aspects of this disclosure.

FIG. 5 is a flow chart showing the stages of an EPOR retract phase 500 in more detail, according to this disclosure. EPOR retract phase 500 begins with $T_{DELAY}$ stage 502, which extracts energy from the spindle (via BBS or synchronous rectification) for a time $T_{DELAY}$ before beginning retraction. When the time $T_{DELAY}$ expires, or when sufficient energy has been generated to begin retraction ($T_{brake\_en}=1$), or if $T_{DELAY}$ 502 stage is disabled, $T_{DELAY}$ stage 502 is exited and $T_{BRAKE}$ stage 504 begins.

In $T_{BRAKE}$ stage 504, lead and support actuators 32A and 32B are braked for a time $T_{BRAKE}$. When the time $T_{BRAKE}$ expires or if $T_{BRAKE}$ stage 504 is disabled, $T_{BRAKE}$ stage 504 is exited and $T_{BOOM}$ stage 506 begins.

In $T_{BOOM}$ stage 506, actuators 32A and 32B are moved toward the disk inner diameter (ID) to build momentum for the swing ("boomerang") to the disk outer diameter (OD) for parking. During $T_{BOOM}$ stage 506, the criteria for the integrator in the PI control loop to turn on is the VCM BEMF being within 20% of the target speed (latched). When the time $T_{BOOM}$ expires or if $T_{BOOM}$ stage 506 is disabled, $T_{BOOM}$ stage 506 is exited and $T_{PARK1}$ stage 508 begins.

In $T_{PARK1}$ stage 508, $T_{PARK1}$ is the active parking time for actuators 32A and 32B, including end-of-travel detection. During $T_{PARK1}$ stage 508, the criteria for the integrator in the PI control loop to turn on is either the VCM BEMF being within 20% of the target speed (latched), or expiration of the integrator holdoff time. When the time $T_{PARK1}$ expires or if $T_{PARK1}$ stage 508 is disabled, $T_{PARK1}$ stage 508 is exited and $T_{PARK2}$ stage 510 begins.

$T_{PARK2}$ stage 510 is a buffer retract stage after $T_{PARK1}$ stage 508 to ensure that actuators 32A and 32B are fully parked. If actuators 32A and 32B are correctly retracted and parked in $T_{PARK1}$ stage 508, $T_{PARK2}$ stage 510 is not needed. When the time $T_{PARK2}$ expires, $T_{PARK2}$ stage 510 is exited and Hold stage 512 begins. If Egress stage 514 is enabled, $T_{PARK2}$ may optionally be set to zero.

As described above, Hold stage 512 is provided for the scenario that lead actuator 32A has finished retracting and is parked, but support actuator 32B has not yet finished retracting and is not parked. In Hold stage 512, lead actuator 32A goes into tri state and the spindle is maintained in a spindle energy extraction state (BBS or synchronous rectification) until support actuator 32B finishes retracting and is parked. In the single PLSI/dual actuator configuration of FIGS. 4A and 4B, Hold stage 512 is exited when registers 406 and 408 indicate that both actuators 32A and 32B are parked. In the dual PLSI/dual actuator configuration of FIG. 4C, Hold stage 512 is exited when the tied nINT signal rises to 1. Alternatively, Hold stage 512 is exited when there has been a timeout of some specified period. In one non-limiting example, the timeout period may be 750 ms. However, a timeout period of any suitable duration may be used.

Egress stage 514 begins when Hold stage 512 is exited. During Egress stage 514, cached write data is egressed from a volatile semiconductor memory, such as dynamic random-access memory (DRAM), to a non-volatile semiconductor memory, such as flash memory. Egress stage 514 is conducted by SoC 414 (FIGS. 4A and 4B) or SoCs 440 and 442 (FIG. 4C) after PLSI 400 (FIGS. 4A and 4B) or PLSIs 420 and 430 (FIG. 4C) communicate to the SoC(s) that both actuators 32A and 32B are parked. The SoCs are responsible for exiting Egress stage 514 when egress has completed. Egress stage 514 may alternatively be exited if Egress stage 514 is not enabled (EgressEn=0), or if a timeout of some specified period has expired.

Once Egress stage 514 is exited, $T_{PARK3}$ stage 516 begins. $T_{PARK3}$ stage 516 comprises three sub-stages: PD Coast stage 518; Extended Park stage 520; and Ramp Down stage 522. PD Coast stage 518 allows the spindle to coast down to a safe RPM (PD Coast) for braking so as not to damage the driver. Once the spindle speed falls below PD Coast, PD Coast stage 518 is exited and Extended Park stage 520 begins. Extended Park stage 520 is a short braking test to ensure that the spindle phase current is safe for the driver, i.e., to ensure that the spindle phase current does not meet or exceed a current limit $I_{LIMIT}$ for some period of time. In one non-limiting example, Extended Park stage 520 continues until the current limit $I_{LIMIT}$ has not been met or exceeded for 8 ms. However, Extended Park stage 520 may last for any suitable duration of time. When Extended Park stage 520 is exited, Ramp Down stage 522 begins. Ramp Down stage 522 is a variable time period during which the VCM voltage ramps down from voltage $V_{PARK3}$ to 0V (VCM DAC count=0).

When the VCM voltage has ramped down to 0V, $T_{PARK3}$ phase 516 is exited and full brake phase 524 begins. Full brake phase 524 is a braking period to ensure that the driver does not overheat before going into final brake phase 526. In one non-limiting example, the braking period of full brake phase 524 is 400 ms. However, full brake phase 524 may use any suitable braking period. Once full brake phase 524 is complete and exited, final brake phase 526 is entered to finish braking and complete EPOR procedure 500.

Figure 6:
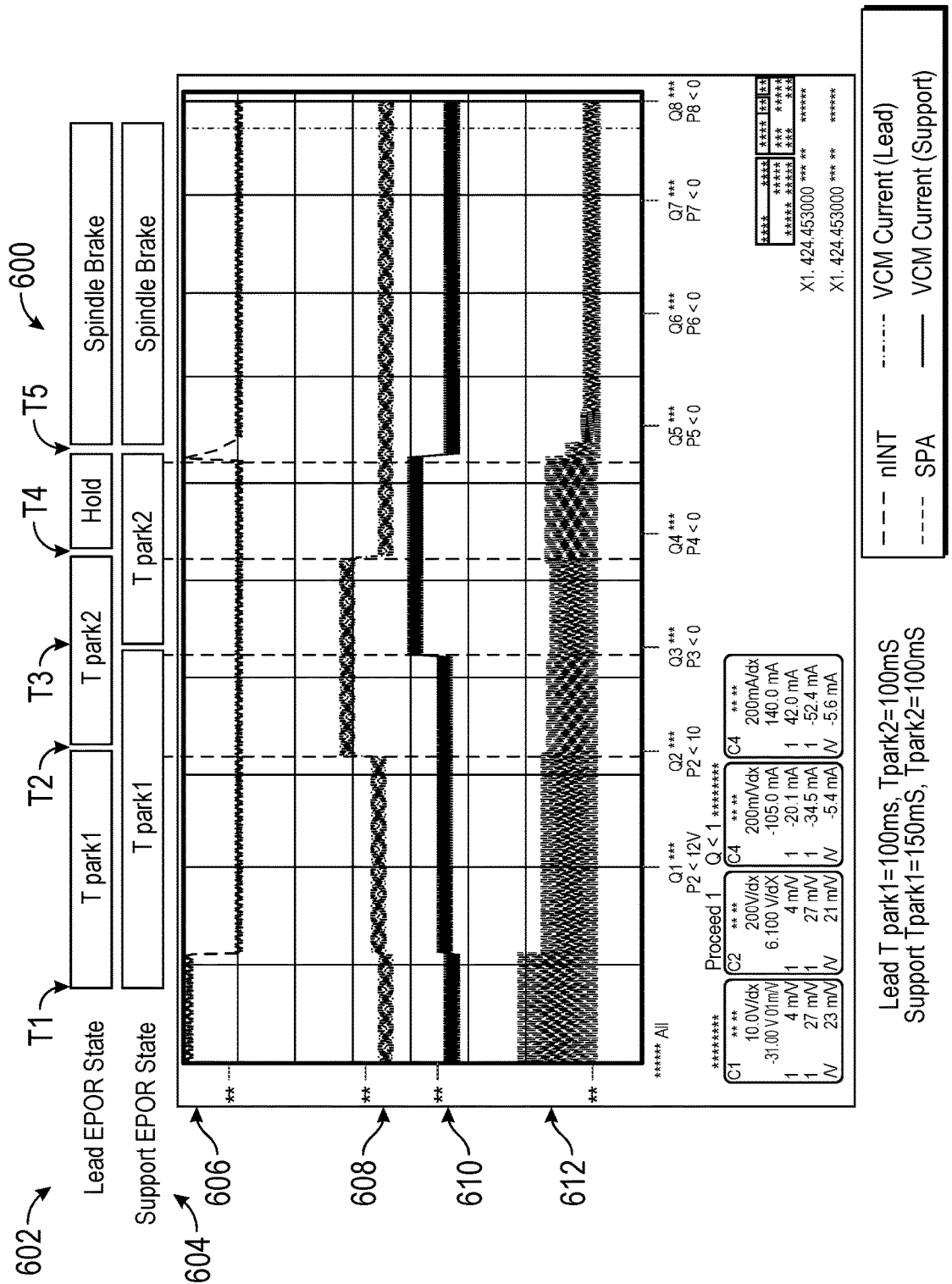
FIG. 6 is a graph illustrating various aspects of the EPOR procedure performed by the dual PLSI/dual actuator configuration of FIG. 4C, according to aspects of this disclosure.

FIG. 6 is a graph 600 illustrating various aspects of an EPOR procedure performed by the dual PLSI/dual actuator configuration of FIG. 4C, in which support actuator 32B takes longer to retract than does lead actuator 32A. The EPOR state (stage) of lead actuator 32A is indicated at 602, and the EPOR state (stage) of support actuator 32b is indicated at 604. The nINT state (high or low) is indicated at 606; the lead actuator (VCM) current is indicated at 608; the support actuator (VCM) current is indicated at 610; and the spindle power level is indicated at 612.

The HDD is in a normal state of operation until time T1, when an EPO event occurs (for example, the host voltage supply falls below a threshold UVwarn12). At time T1, the lead EPOR state 602 and the support EPOR state 604 go to the $T_{PARK1}$ stage (with reference to FIG. 5, if any or all of $T_{DELAY}$ stage 502, $T_{BRAKE}$ stage 504 and/or $T_{BOOM}$ stage 506 are enabled, the lead and support EPOR states will go to the $T_{PARK1}$ stage shortly after time T1) to begin retraction and parking of lead actuator 32A and support actuator 32B. As described above, when lead actuator 32A and support actuator 32B begin retraction and parking in the $T_{PARK1}$ phase at time T1, the nINT pin state 606 goes from high to low. Lead actuator current 608 and support actuator current 610 elevate at time T1 to power retraction and parking of lead actuator 32A and support actuator 32B. Spindle power generation 612 is maintained via BBS or synchronous rectification to power retract of actuators 32A and 32B and other power down operations.

In the example of FIG. 6, support actuator 32B takes longer to retract than does lead actuator 32A, and thus has a longer $T_{PARK1}$ stage. In the non-limiting example of FIG. 6, $T_{PARK1}$ for lead actuator 32A is 100 ms, $T_{PARK1}$ for support actuator 32B is 150 ms, and $T_{PARK2}$ for each of actuators 32A and 32B is 100 ms. At time T2, lead actuator 32A exits the $T_{PARK1}$ stage and enters the $T_{PARK2}$ stage, and lead actuator current 608 is further elevated to complete parking. Support actuator 32B, which has a longer $T_{PARK1}$ stage, remains in the $T_{PARK1}$ stage at time T2, and the nINT pin state 606 remains low. At time T3, support actuator 32B exits the $T_{PARK1}$ stage and enters the $T_{PARK2}$ stage, and support actuator current 610 further elevates to complete parking. Lead actuator 32A remains in the $T_{PARK2}$ stage and has not yet finished parking at time T3, and the nINT pin state 606 therefore remains low.

At time T4, lead actuator 32A finishes parking, and lead actuator current 608 decreases. Since retraction of lead actuator 32A is complete, lead PLSI 420 releases its nINT pin 428. However, since support actuator 32B has not finished parking, support PLSI 430 has not yet released its nINT pin 438 and the tied nINT state 606 remains low. Lead actuator 32A enters the Hold stage at time T4 and remains there until time T5 when support actuator 32B finishes parking. During the Hold stage, lead actuator 32A goes into tri state and spindle motor 50 is maintained in a spindle energy extraction state (BBS or synchronous rectification). At time T5, support actuator 32B finishes parking, support actuator current 610 decreases, and support PLSI 430 releases its nINT pin 438. Since both PLSIs 420 and 430 have released their nINT pins at time T5, the nINT pin state 606 goes high, which causes lead PLSI 420 to exit the Hold stage and to proceed with braking the spindle (i.e. move to the $T_{PARK3}$, full brake and final brake stages of FIG. 5). Thus, at time T5, the spindle power generation mode is no longer maintained and spindle power state 612 substantially decreases.

Another aspect of this disclosure is an egress throttling method performed by control circuitry 22 that pauses (throttles) egress when the internal supply voltage Vpwr drops below certain thresholds and resumes egress when the internal supply voltage has recovered. The egress throttling method permits egress both before and after actuators 32A and 32B have finished retracting and parking, depending on the internal supply voltage level relative to the thresholds. This feature advantageously allows egress to start more quickly and more data to be written to flash or other non-volatile memory if there is sufficient power to conduct retract and egress simultaneously, and allows Vpwr to be boosted higher (during egress throttle) such that a longer egress time is provided before the final threshold (Uv_Vpwr) is tripped and egress is aborted.

A first egress throttling threshold (Vpwr_low) is provided that is greater than the actuator (VCM) throttling threshold (Vpwr_bad) and is used if egress is enabled before the actuators have finished parking, such that retract of the actuators has priority (egress is throttled before retracting and parking is throttled) while the actuators are still parking. In addition, a second egress throttling threshold (D5V_Low_Egress) is provided that is less than the actuator throttling threshold (Vpwr_bad) and is used after the actuators have finished parking. The second egress throttling threshold can be more aggressive (set at a lower level) since parking of the actuators is complete.

During normal operation, disk drive 20 receives a first, higher host supply voltage (e.g., a 12V line) for powering components such as spindle motor 50 and the actuators (VCMs), and a second, lower host supply voltage (e.g., a 5V line) for powering control circuitry such as the SoCs used for data egress. During an EPO event, the internal supply voltage Vpwr generated from the BEMF voltage is present on these voltage supply lines. In egress throttling method 700, before the actuators are parked, the first egress throttling threshold Vpwr_Low is compared with the higher internal supply voltage on the 12V line, referred to below as Vpwr. After the actuators are parked, the second egress throttling threshold D5V_Low_Egress is compared with the lower internal supply voltage on the 5V line, referred to below as D5V.

The various thresholds of this disclosure may have any suitable and appropriate values. In one non-limiting example, UVwarn12=10V; Vpwr_Low=5V; Vpwr_Bad=4V; D5V_Low_Egress=3V; and Uv_Vpwr=2.5V.

Figure 7:
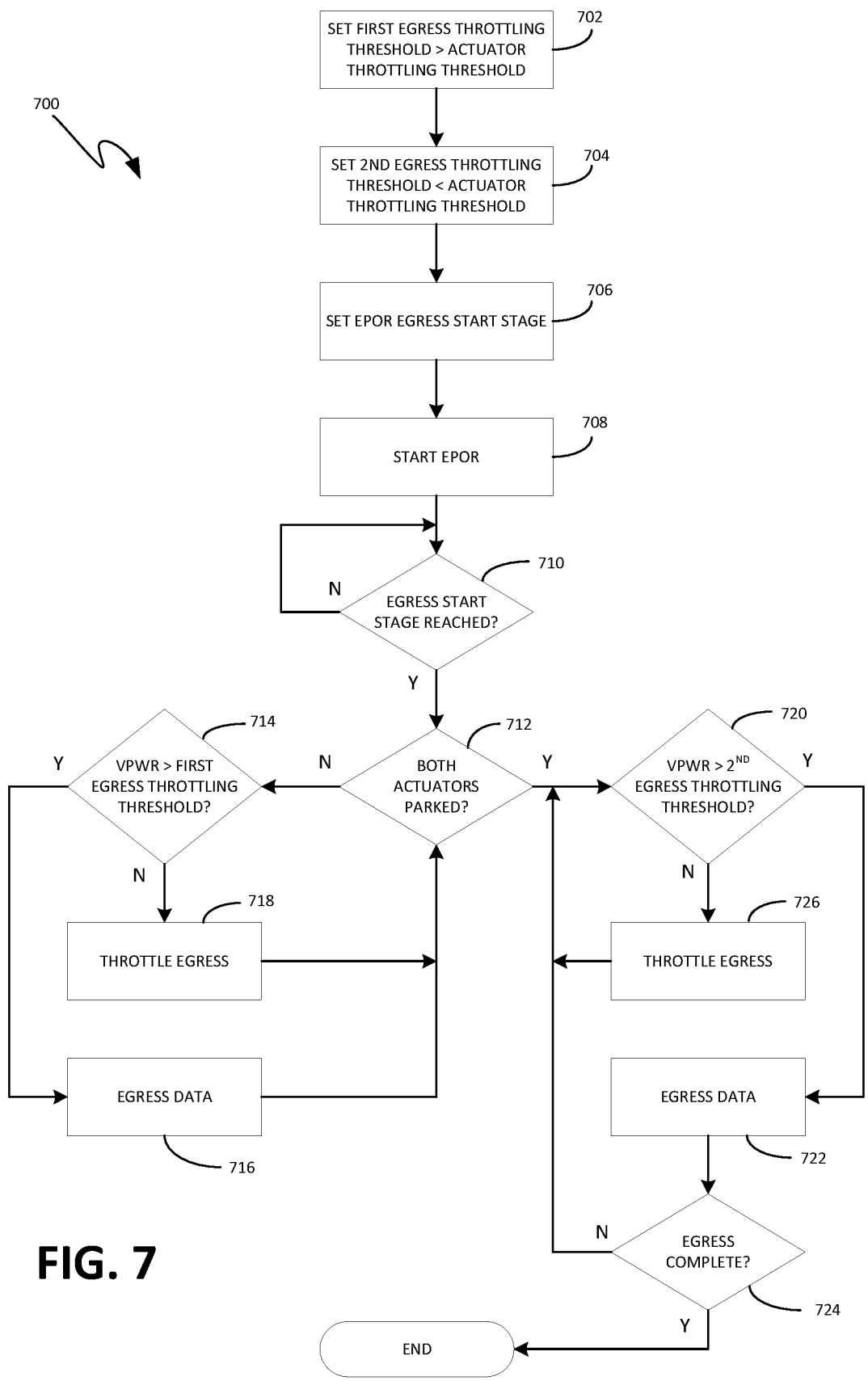
FIG. 7 is a flow chart illustrating an egress throttling method performed by the control circuitry of the disk drive, according to aspects of this disclosure.

FIG. 7 is a flow chart illustrating an egress throttling method 700 performed by control circuitry 22, according to aspects of this disclosure. In step 702, a first egress throttling threshold Vpwr_Low is set to or selected to be a value greater than the value of actuator throttling threshold Vpwr- _Bad. If the first egress throttling threshold is disabled, it can be considered as having been set to zero. In step 704, a second egress throttling threshold D5V_Low_Egress is set to or selected to be a value that is less than the value of actuator throttling threshold Vpwr_Bad. If the second egress throttling threshold has been disabled, it can be considered as having been set to or selected to be zero.

In step 706, the stage at which egress will start during the EPOR retract phase is set or selected. With reference to FIG. 5, one of the stages of EPOR retract phase 500 is chosen as the time at which data egress begins. Although any stage of EPOR retract phase 500 may potentially be chosen as the time at which egress will begin, in one implementation, the egress start stage is one of $T_{BRAKE}$ stage 504, $T_{PARK1}$ stage 508, $T_{PARK2}$ stage 510, Hold stage 512 or Egress stage 514.

The selectability/programmability of the EPOR stage at which egress begins and the selectability/programmability of different voltage levels for throttling egress advantageously provides the disk drive of this disclosure with substantial flexibility and customizability.

In step 708, the EPOR procedure is started. In one implementation, the EPOR procedure is started when the internal supply voltage Vpwr (12V line) decreases to EPOR threshold voltage Uvwarn12. Once the selected egress start stage has been reached (step 710-Y), step 712 determines whether both actuators are parked (i.e., whether the EPOR procedure has gone beyond the Hold stage). If both actuators are not yet parked (step 712-N), allowing or throttling egress is based on the first egress throttling threshold Vpwr_Low, which is greater than the actuator throttling threshold Vpwr_Bad.

In particular, when the current internal supply voltage level Vpwr (12V line) is greater than the first egress throttling threshold Vpwr_Low (as determined by a comparator in control circuitry 22, for example) (step 714-Y), egress proceeds in step 716. When Vpwr falls to or below the first egress throttling threshold Vpwr_Low (step 714-N), egress is throttled in step 718. Until both actuators are parked, control circuitry 22 continues to monitor whether the internal supply voltage Vpwr is above or below the first egress throttling threshold, and either allows or throttles egress of data based on that comparison.

Once both actuators have parked (step 712-Y), allowing or throttling egress is determined with reference to the second egress throttling threshold D5V_Low_Egress, which is less than the actuator throttling threshold Vpwr_Bad. In particular, when the internal supply voltage level D5V (5V line) is greater than the second egress throttling threshold D5V_Low_Egress (step 720-Y), data is egressed in step 722. When the internal supply voltage D5V falls to or below the second egress throttling threshold D5V_Low_Egress (step 720-N), egress is throttled in step 726. Until egress is complete (step 724-Y), control circuitry 22 continues to monitor whether the internal supply voltage D5V is above or below the second egress throttling threshold, and either allows or throttles egress of data based on this comparison. In this regard, egress may be considered complete when either all data in the write cache has been egressed, or when the internal supply voltage falls below the final threshold Uv_Vpwr, in which case there is no longer sufficient power remaining to egress data, and egress of data is aborted.

FIGS. 8-11 are graphs illustrating various applications of egress throttling method 700 of FIG. 7, and highlighting the programmability and customizability provided by method 700. With reference to the single PLSI/dual actuator configuration of FIG. 4A, the nINT pin 412 of PLSI 400 is used to communicate with SoC 414 to throttle egress (low signal) or allow egress (high signal). The signal on nINT pin 412 is mapped in FIGS. 8-11 with reference to the PLSI (Lead) EPOR state, lead actuator state (VCM State Lead Act), and support actuator state (VCM State Support Act) on the x-axis, with a high signal indicating egress and a low signal indicating throttling.

Also shown in FIGS. 8-11 are the internal supply voltage Vpwr (12V) and D5V (5V) signals. The Vpwr and D5V signals are mapped on the y-axis with reference to various voltage thresholds including UVwarn12 (EPOR threshold), Vpwr_Low (first egress throttling threshold), Vpwr_Bad (actuator throttling threshold), D5V_Low_Egress (second egress throttling threshold) and Uv_Vpwr (actuator and egress abort threshold). On the x-axis, the Vpwr and D5V signals are mapped with reference to the PLSI (Lead) EPOR state, lead actuator state (VCM State Lead Act), and support actuator state (VCM State Support Act). As can be seen in FIGS. 8-11, the Vpwr and D5V signals have a periodic falling pattern as the power generated by the BEMF voltage is consumed by power down operations such as retract and parking, braking and egress, followed by a rising pattern as these operations are paused or throttled to allow Vpwr to be boosted back up.

Figure 8:
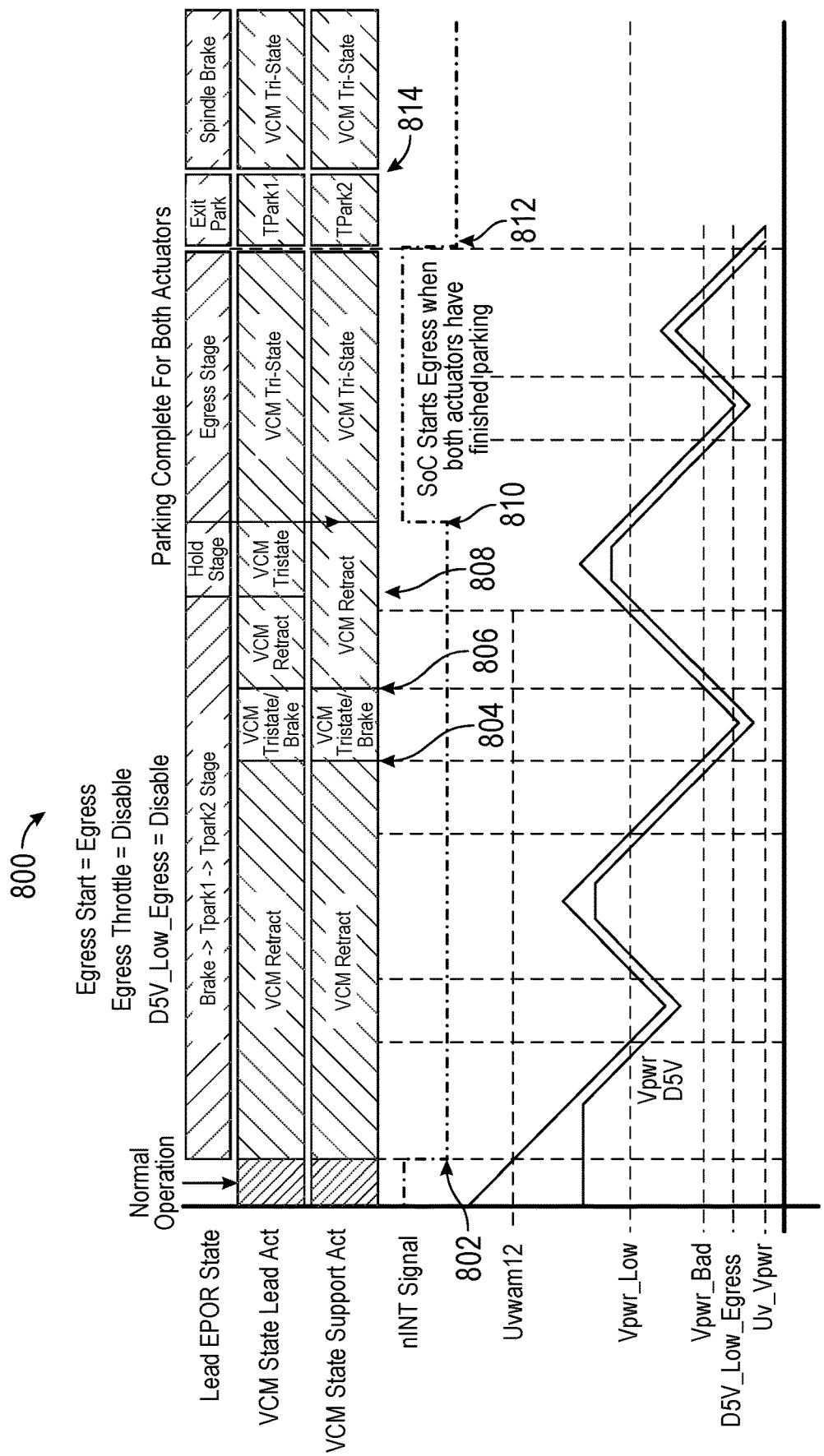
FIG. 8 is a graph illustrating various aspects of the egress throttling method of FIG. 7, with egress set to begin in the Egress stage and throttling disabled, according to aspects of this disclosure.

Graph 800 of FIG. 8 is a base example of egress throttling method 700 with egress set to begin in the Egress stage and throttling disabled. The first and second egress throttling thresholds are set to zero (disabled) in steps 702 and 704. The EPOR egress start stage is set to Egress in step 706. EPOR starts in step 708, for example, at time 802 when the internal supply voltage Vpwr decreases to the EPOR threshold voltage Uvwarn12. The nINT signal falls to low at time 802, indicating the loss of power to SoC 414 such that SoC 414 cannot perform data egress. Since the egress start stage is set to Egress, the method does not proceed past step 710 (710-N) until the Egress stage is reached at time 810, and no data is egressed during the retract and parking stages. Until the Egress stage is reached at time 810, the nINT pin 412 continues to have a low signal and no data is egressed from SoC 414.

As can be seen in FIG. 8, between times 802 and 810, the Lead EPOR state progresses through the $T_{BRAKE}$, $T_{PARK1}$, $T_{PARK2}$ and Hold stages. Both the lead and support actuators are in a VCM Retract state until Vpwr decreases to the actuator throttling threshold Vpwr_Bad at time 804. Retract is throttled at time 804 and the lead and support actuators go into a tri state/brake state until Vpwr recovers at time 806. At time 806, the lead and support actuators return to a VCM retract state. The lead actuator finishes retracting first, at time 808, and goes into tri state, and the Lead EPOR State enters the Hold stage while the support actuator finishes retracting. The support actuator finishes retracting at time 810, and the Lead EPOR State changes from the Hold stage to the Egress stage.

Once the Egress stage is reached (step 710-Y), both actuators are parked (step 712-Y), and Vpwr is always greater than the second egress throttling threshold since it has been set to zero (step 720-Y). The nINT pin 412 rises to a high signal at time 810, such that power is provided to SoC 414 and egress of data can proceed in step 722. Data is egressed without throttling through the Egress stage until egress is complete at time 812 (step 724). The nINT pin signal remains high from time 810 to time 812, such that power is provided to SoC 414 and data can be egressed. At time 812, the Egress stage ends, the nINT pin signal falls back to low, and the Lead EPOR stage changes from Egress to $T_{PARK3}$, which includes the PD Coast, Extended Park and Ramp Down stages. From time 812 to time 814, the VCM voltage ramps down from voltage $V_{PARK3}$ to 0V. At time 814, the full spindle brake is applied, and both VCMs (actuators) are placed into tri state.

Figure 9:
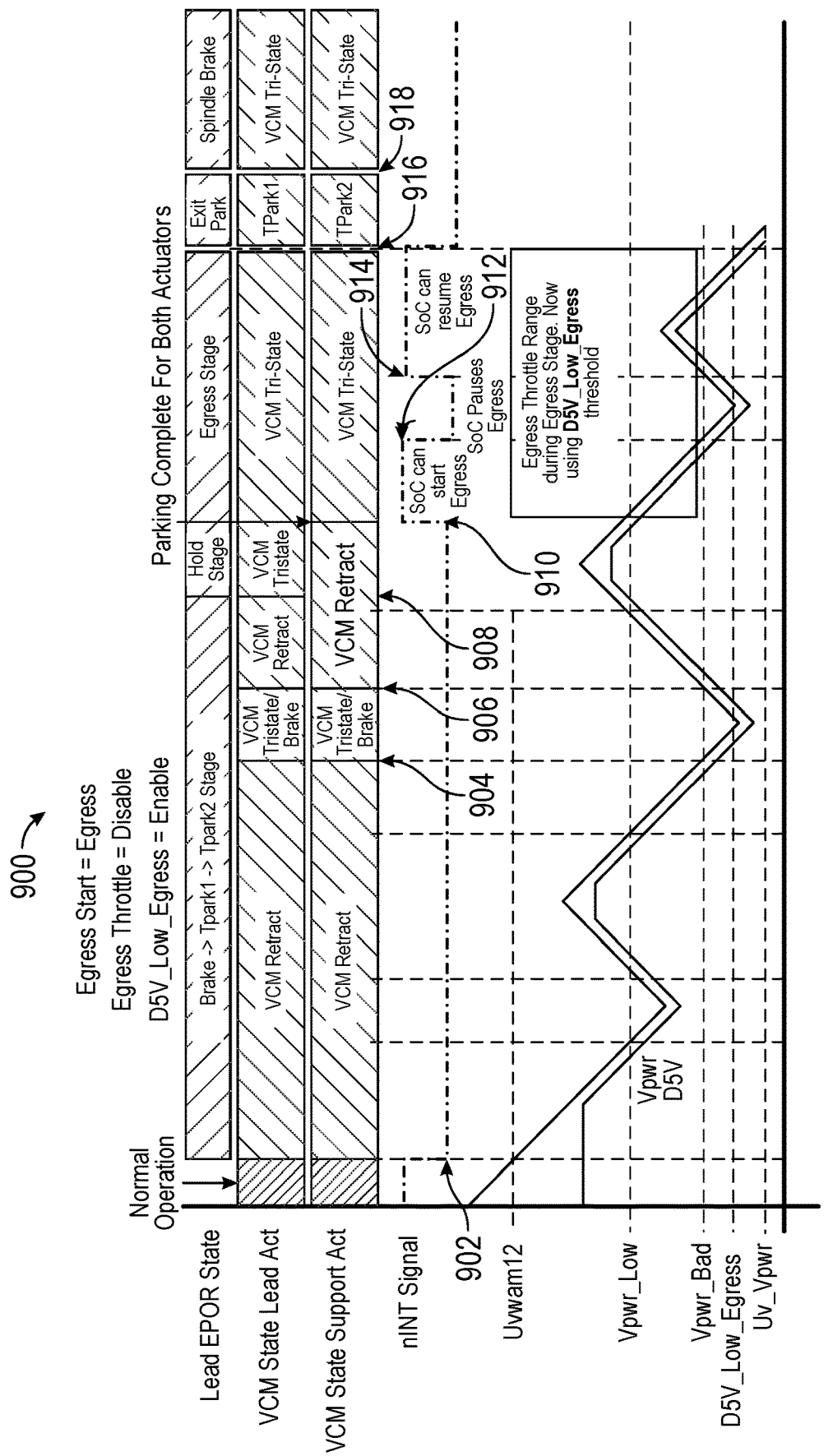
FIG. 9 is a graph illustrating various aspects of the egress throttling method of FIG. 7, with egress set to begin in in the Egress stage and one egress throttling threshold enabled, according to aspects of this disclosure.

Graph 900 of FIG. 9 is an example of egress throttling method 700 with egress set to begin in the Egress stage and throttling enabled using the second egress throttling threshold (D5V_Low_Egress). The first egress throttling threshold is set to zero (disabled) in step 702. In step 704, the second egress throttling threshold is set to D5_Low_Egress. The EPOR egress start stage is set to Egress in step 706. EPOR starts in step 708 at time 902 when the internal supply voltage Vpwr decreases to the EPOR threshold voltage Uvwarn12. The nINT signal falls to low at time 902, indicating the loss of power to SoC 414 such that SoC 414 cannot perform data egress. Since the egress start stage is set to Egress, the method does not proceed past step 710 (710-N) until the Egress stage is reached at time 910, and no data is egressed during the retract and parking stages. Until the Egress stage is reached at time 910, nINT pin 412 continues to have a low signal and no data is egressed from SoC 414.

As can be seen in FIG. 9, between times 902 and 910, the Lead EPOR state progresses through the $T_{BRAKE}$, $T_{PARK1}$, $T_{PARK2}$ and Hold stages. Both the lead and support actuators are in a VCM Retract state until Vpwr decreases to the actuator throttling threshold Vpwr_Bad at time 904. Retract is throttled at time 904 and the lead and support actuators go into a tri state/brake state until Vpwr recovers at time 906. At time 906, the lead and support actuators return to a VCM retract state. The lead actuator finishes retracting first, at time 908, and goes into tri state, and the Lead EPOR State enters the Hold stage while the support actuator finishes retracting. The support actuator finishes retracting at time 910, and the Lead EPOR State changes from the Hold stage to the Egress stage.

Once the Egress stage is reached at time 910 (step 710-Y), both actuators are parked (step 712-Y), and nINT pin 412 rises to a high signal, such that power is provided to SoC 414 and egress of data can proceed. Since the second egress throttling threshold has been set to D5_Low_Egress, data is egressed in step 722 so long as the supply voltage D5V is greater than D5_Low_Egress (step 720-Y). At time 912, the supply voltage has fallen to the D5_Low_Egress threshold (step 720-N), the nINT pin signal drops to low and egress of data is throttled in step 726. Throttling continues until time 914 when supply voltage D5V has recovered to be above D5_Low_Egress (step 720-Y). At time 914, the nINT signal rises to high and SoC 414 resumes egress in step 722. Egress continues until egress is complete at time 916 (step 724). At time 916, the Egress stage ends, the nINT pin signal falls back to low, and the Lead EPOR stage changes from Egress to $T_{PARK3}$, which includes the PD Coast, Extended Park and Ramp Down stages. From time 916 to time 918, the VCM voltage ramps down from voltage $V_{PARK3}$ to 0V. At time 918, the full spindle brake is applied, and both VCMs (actuators) are placed into tri state.

Figure 10:
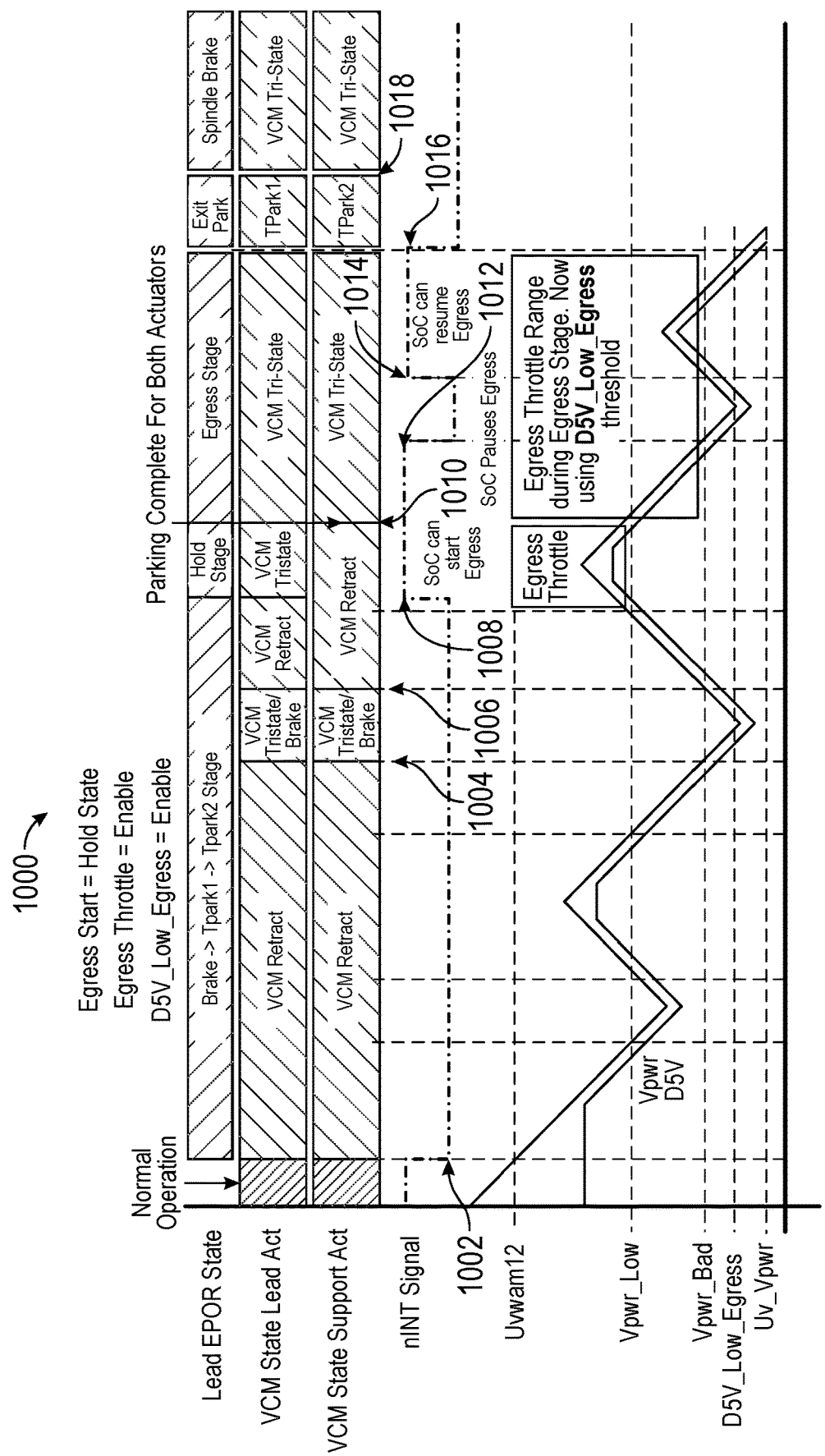
FIG. 10 is a graph illustrating various aspects of the egress throttling method of FIG. 7, with egress set to begin in the Hold stage and two egress throttling thresholds enabled, according to aspects of this disclosure.

Graph 1000 of FIG. 10 is an example of egress throttling method 700 with egress set to begin at the Hold stage and throttling enabled using both the first egress throttling threshold Vpwr_Low and the second egress throttling threshold (D5V_Low_Egress). The first egress throttling threshold is set to Vpwr_Low in step 702. In step 704, the second egress throttling threshold is set to D5_Low_Egress. The EPOR egress start stage is set to Hold in step 706. EPOR starts in step 708 at time 1002 when the internal supply voltage Vpwr falls to the EPOR threshold voltage Uvwarn12. The nINT signal falls to low at time 1002, indicating the loss of power to SoC 414 such that SoC 414 cannot perform data egress. Since the egress start stage is set to Hold, the method does not proceed past step 710 (710-N) until the Hold stage is reached at time 1008, and no data is egressed until the Hold stage. Until the Hold stage is reached at time 1008, nINT pin 412 continues to have a low signal and no data can be egressed from SoC 414.

As can be seen in FIG. 10, between times 1002 and 1008, the Lead EPOR state progresses through the $T_{BRAKE}$, $T_{PARK1}$ and $T_{PARK2}$ stages. Both the lead and support actuators are in a VCM Retract state until Vpwr decreases to the actuator throttling threshold Vpwr_Bad at time 1004. Retract is throttled at time 1004 and the lead and support actuators go into a tri state/brake state until Vpwr recovers at time 1006. At time 1006, the lead and support actuators return to a VCM retract stage. The lead actuator finishes retracting first, at time 1008, and goes into tri state, and the Lead EPOR State enters the Hold stage while the support actuator finishes retracting.

Once the Hold stage is reached at time 1008 (step 710-Y), nINT pin 412 rises to a high signal, such that power is provided to SoC 414 and egress of data can proceed. So long as both actuators are not parked (step 712-N), that is, until the Hold stage ends at time 1010, data is egressed in step 716 so long as Vpwr remains above the first egress throttling threshold Vpwr_Low (step 714-Y). In the example of FIG. 10, Vpwr remains above Vpwr_Low throughout the Hold stage, so egress continues until time 1010. The support actuator finishes retracting at time 1010, and the Lead EPOR State changes from the Hold stage to the Egress stage.

Once the Hold stage ends at time 1010 and both actuators are parked (step 712-Y), data is egressed or throttled with reference to the second egress throttling threshold D5V_Low_Egress, and data is egressed in step 722 so long as the supply voltage D5V is greater than D5_Low_Egress (step 720-Y). D5V is greater than D5V_Low_Egress from time 1010 to time 1012, so the nINT pin remains high and egress continues until time 1012. Thus, although egress/throttling is determined by comparison of Vpwr with Vpwr_Low from time 1008 to time 1010, and by comparison of D5V with D5V_Low_Egress from time 1010 to time 1012, egress continues uninterrupted from the start of the Hold stage at time 1008 until partially through the Egress stage at time 1012.

At time 1012, the supply voltage D5V has fallen to the D5_Low_Egress threshold (step 720-N), the nINT pin signal drops to low and egress of data is throttled in step 726. Throttling continues until time 1014 when supply voltage D5V has recovered to be above D5_Low_Egress (step 720-Y). At time 1014, the nINT signal rises to high and SoC 414 resumes egress in step 722. Egress continues until egress is complete at time 1016 (step 724). At time 1016, the Egress stage ends, the nINT pin signal falls back to low, and the Lead EPOR stage changes from Egress to $T_{PARK3}$, which includes the PD Coast, Extended Park and Ramp Down stages. From time 1016 to time 1018, the VCM voltage ramps down from voltage $V_{PARK3}$ to 0V. At time 1018, the full spindle brake is applied, and both VCMs (actuators) are placed into tri state.

Figure 11:
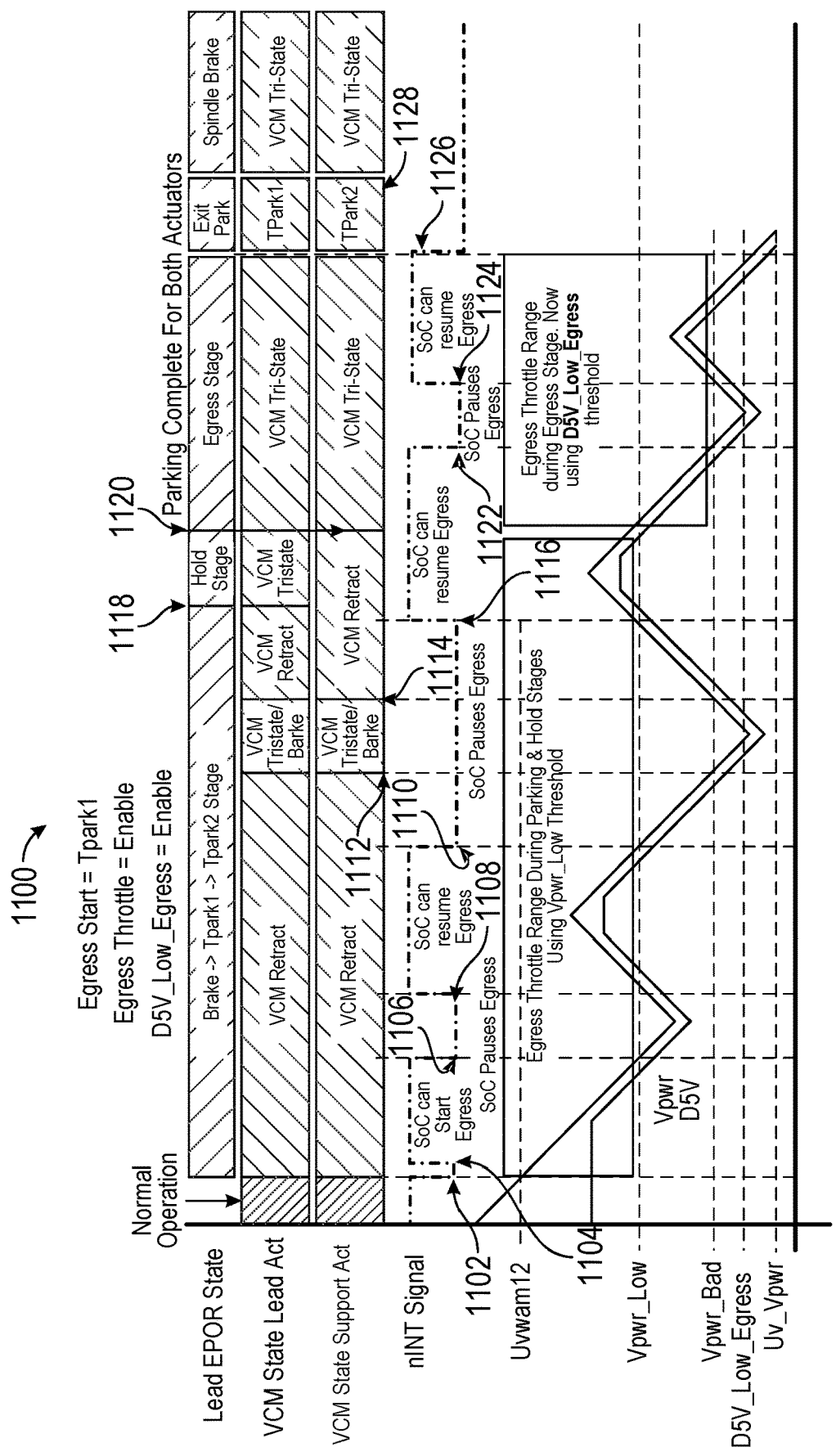
FIG. 11 is a graph illustrating various aspects of the egress throttling method of FIG. 7, with egress set to begin in the $T_{PARK1}$ stage and two egress throttling thresholds enabled, according to aspects of this disclosure.

Graph 1100 of FIG. 11 is an example of egress throttling method 700 with egress set to begin at the $T_{PARK1}$ stage and throttling enabled using both the first egress throttling threshold Vpwr_Low and the second egress throttling threshold (D5V_Low_Egress). The first egress throttling threshold is set to Vpwr_Low in step 702. In step 704, the second egress throttling threshold is set to D5_Low_Egress. The EPOR egress start stage is set to $T_{PARK1}$ in step 706.

EPOR starts in step 708 at time 1102 when the internal supply voltage Vpwr decreases to the EPOR threshold voltage Uvwarn12. The nINT signal falls to low at time 1102, indicating the loss of power to SoC 414 such that SoC 414 cannot perform data egress. Once the $T_{PARK1}$ stage is reached at time 1104 (step 710-Y), after the relatively short $T_{BRAKE}$ stage is complete, nINT pin 412 rises to a high state, such that power is provided to SoC 414 and egress of data can proceed.

At time 1104, since both actuators are not yet parked (step 712-N), data is egressed in step 716 so long as Vpwr remains above the first egress throttling threshold Vpwr_Low (step 714-Y). In the example of FIG. 11, Vpwr remains above Vpwr_Low until time 1106. At time 1106, the supply voltage Vpwr decreases to the Vpwr_Low threshold (step 714-N), the nINT pin signal drops to low and egress of data is throttled in step 718. Throttling continues until time 1108 when supply voltage Vpwr has recovered to be above Vpwr_Low (step 714-Y). At time 1108, the nINT signal rises to high and SoC 414 resumes egress in step 716.

From time 1108, data is egressed again so long as Vpwr remains above Vpwr_Low (step 714-Y). In the example of FIG. 11, Vpwr remains above Vpwr_Low until time 1110. At time 1110, the supply voltage Vpwr again decreases to the Vpwr_Low threshold (step 714-N), the nINT pin signal drops to low and egress of data is again throttled in step 718. Throttling continues from time 1110 until supply voltage Vpwr recovers to be above Vpwr_Low.

Between times 1102 and 1110, the Lead EPOR state progresses through the $T_{BRAKE}$, $T_{PARK1}$ and $T_{PARK2}$ stages. Both the lead and support actuators are in a VCM Retract state until Vpwr decreases to the actuator throttling threshold Vpwr_Bad at time 1112. Retract is throttled at time 1112 and the lead and support actuators go into a tri state/brake state until Vpwr recovers at time 1114. At time 1114, the lead and support actuators return to a VCM retract stage.

At time 1116, supply voltage Vpwr again recovers to be above Vpwr_Low (step 714-Y), the nINT signal rises to high and SoC 414 resumes egress in step 716. So long as both actuators are not parked (step 712-N), that is, until the Hold stage ends at time 1120, data is egressed in step 716 so long as Vpwr remains above the first egress throttling threshold Vpwr_Low (step 714-Y). In the example of FIG. 11, Vpwr remains above Vpwr_Low throughout the Hold stage, so egress continues until time 1120. The lead actuator finishes retracting at time 1118, and goes into tri state, and the Lead EPOR State enters the Hold stage while the support actuator finishes retracting. The support actuator finishes retracting at time 1120, and the Lead EPOR State changes from the Hold stage to the Egress stage.

Once the Hold stage ends at time 1120 and both actuators are parked (step 712-Y), data is egressed or throttled with reference to the second egress throttling threshold D5V_Low_Egress, and data is egressed in step 722 so long as the supply voltage D5V is greater than D5_Low_Egress (step 720-Y). D5V is greater than D5V_Low_Egress from time 1120 to time 1122, so the nINT pin remains high and egress continues until time 1122. Thus, although egress/throttling is determined by comparison of Vpwr with Vpwr_Low from time 1116 to time 1120, and by comparison of D5V with D5V_Low_Egress from time 1120 to time 1122, egress continues uninterrupted from time 1116 before the Hold stage begins until partially through the Egress stage at time 1122.

At time 1122, the supply voltage D5V decreases to the D5_Low_Egress threshold (step 720-N), the nINT pin signal drops to low and egress of data is throttled in step 726. Throttling continues until time 1124 when supply voltage D5V has recovered to be above D5_Low_Egress (step 720-Y). At time 1124, the nINT signal rises to high and SoC 414 resumes egress in step 722. Egress continues until egress is complete at time 1126 (step 724). At time 1126, the Egress stage ends, the nINT pin signal falls back to low, and the Lead EPOR stage changes from Egress to $T_{PARK3}$, which includes the PD Coast, Extended Park and Ramp Down stages. From time 1126 to time 1128, the VCM voltage ramps down from voltage $V_{PARK3}$ to 0V. At time 1018, the full spindle brake is applied, and both VCMs (actuators) are placed into tri-state.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example they are fabricated into a single integrated circuit or system on a chip (SoC). In addition, the control circuitry may include a preamp circuit implemented as a separate integrated circuit, integrated into the read channel or data storage controller circuit, or integrated into an SoC.

In some examples, the control circuitry comprises a microprocessor executing instructions, the instructions being operable to cause the microprocessor to perform the flow diagrams described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and sub-combinations are intended to fall within the scope of this disclosure. In addition, certain method, event, or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments and implementations are described herein, these embodiments and implementations are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions, and changes in the form of the methods and systems described herein may be made without departing from the spirit and scope of the present disclosure.

Methods 300 and 700, and other methods of this disclosure may include other steps or variations in various other embodiments. Some or all of any of methods 300 and 700 may be performed by or embodied in hardware, and/or performed or executed by a controller, a CPU, an FPGA, a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for EPOR and dual actuators, EPOR and dual actuator control, and other aspects of this disclosure. Persons skilled in the relevant fields of art will be well-equipped by this disclosure with an understanding and an informed reduction to practice of a wide panoply of further applications, architectures, techniques, and methods for EPOR and dual actuators, EPOR and dual actuator control, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device comprising:
   a first actuator configured to actuate a first read-write head over at least a first disk;
   a second actuator configured to actuate a second read-write head over at least a second disk;
   a spindle motor configured to rotate the first disk and the second disk; and
   one or more processing devices or components, the one or more processing devices or components comprising a system on a chip (SoC) and at least one power large scale integrated circuit (PLSI) that is configured to drive the first and second actuators, and wherein the one or more processing devices or components are configured, individually or in combination, in response to an emergency power off (EPO) event, to:
      retract and park the first actuator and the second actuator using an internal supply voltage generated from a back electromotive force (BEMF) voltage of the spindle motor, and
      brake the spindle motor,
   and
   wherein the at least one PLSI is further configured to communicate with the SoC to initiate data egress during the EPO event, and wherein the one or more processing devices or components are further configured, individually or in combination, to:
      egress data to non-volatile memory, based at least in part on comparing the internal supply voltage generated from the BEMF voltage to one or more egress throttling threshold voltages.

2. The data storage device of claim 1, wherein the one or more processing devices or components are further configured, individually or in combination, to:

not brake the spindle motor until both the first and the second actuators have been retracted and parked; and
place the first actuator into a hold state when the first actuator finishes retracting and parking before the second actuator finishes retracting and parking.

3. The data storage device of claim 2, wherein:
the first actuator comprises a lead actuator;
the second actuator comprises a support actuator; and
the hold state places the lead actuator into a tri state.

4. The data storage device of claim 1, wherein the at least one PLSI comprises a single PLSI that is configured to drive both the first actuator and the second actuator, and wherein the single PLSI further comprises:
a lead driver configured to drive the first actuator to retract and park; and
a support driver configured to drive the second actuator to retract and park.

5. The data storage device of claim 4, wherein:
the single PLSI comprises an open-drain, active low output pin or nINT pin for communicating with the SoC; and
the nINT pin is configured to output a low signal for throttling egress of the data and a high signal for allowing egress of the data.

6. The data storage device of claim 1, wherein:
the at least one PLSI comprises a lead PLSI and a support PLSI;
the first actuator comprises a lead actuator; and
the second actuator comprises a support actuator; and
the one or more processing devices or components are further configured, individually or in combination, to:
drive the lead actuator to retract and park by the lead PLSI; and
drive the support actuator to retract and park by the support PLSI.

7. The data storage device of claim 6, wherein:
the lead PLSI comprises a lead nINT pin that is coupled to a drain of a lead metal oxide semiconductor field effect transistor (MOSFET); and
the support PLSI comprises a support nINT pin that is coupled to a drain of a support MOSFET.

8. The data storage device of claim 7, wherein:
the lead nINT pin and the support nINT pin are tied together to indicate when both the lead actuator and the support actuator have been retracted and parked;
the lead nINT pin is configured to be pulled down to a low state when the lead PLSI is driving the lead actuator to retract and park in response to the EPO event;
the support nINT pin is configured to be pulled down to a low state when the support PLSI is driving the second actuator to retract and park in response to the EPO event; and
each of the lead nINT pin and the support nINT pin is configured to be released and pulled up to a high state when both the lead actuator and the support actuator have been retracted and parked by the lead PLSI and the support PLSI, respectively.

9. The data storage device of claim 8, wherein the lead PLSI is configured to, based on detecting the high state on the tied lead and support nINT pins, at least one of:
initiate a data egress state; and
transition the spindle motor into a spindle braking state.

10. The data storage device of claim 1, wherein the one or more egress throttling threshold voltages comprise:
a first egress throttling threshold voltage that is greater than an actuator throttling threshold voltage; and
a second egress throttling threshold voltage that is lower than the actuator throttling threshold voltage.

11. The data storage device of claim 10, wherein, after the first actuator is retracted and parked, the one or more processing devices or components are further configured, individually or in combination, to:
egress the data, based at least in part on determining that the internal supply voltage is greater than the first egress throttling threshold voltage; and
egress the data, based at least in part on determining that the second actuator is retracted and parked, and that another internal supply voltage is greater than the second egress throttling threshold voltage, wherein the another internal supply voltage is lower than the internal supply voltage.

12. The data storage device of claim 11, wherein the one or more processing devices or components are further configured, individually or in combination, to:
abort egressing of the data when the internal supply voltage is lower than a final threshold voltage, the spindle motor is braked, or a combination thereof.

13. The data storage device of claim 1, wherein the internal supply voltage is generated using at least one of:
a synchronous rectification technique, wherein the synchronous rectification technique comprises rectifying the BEMF voltage to generate the internal supply voltage; and
a boost/brake technique, wherein the boost/brake technique comprises periodically shorting windings of the spindle motor to boost the BEMF voltage.

14. A method comprising:
actuating, by a first actuator, a first read-write head over at least a first disk;
actuating, by a second actuator, a second read-write head over at least a second disk;
rotating, by a spindle motor, the first disk and the second disk;
controlling, by one or more processing devices or components, in response to an emergency power off (EPO) event, the first actuator and the second actuator to retract and park using an internal supply voltage generated from a back electromotive force (BEMF) voltage of the spindle motor;
controlling, by the one or more processing devices or components, the spindle motor to brake;
wherein the one or more processing devices or components comprise a system on a chip (SoC) and at least one power large scale integrated circuit (PLSI) that is configured to drive the first and second actuators, and
wherein the at least one PLSI is further configured to communicate with the SoC to initiate data egress during the EPO event; and
egressing, by the one or more processing devices or components, data to non-volatile memory, based at least in part on comparing the internal supply voltage generated from the BEMF voltage to one or more egress throttling threshold voltages.

15. The method of claim 14, further comprising placing, by the one or more processing devices or components, the first actuator into a hold state when the first actuator finishes retracting and parking before the second actuator finishes retracting and parking, and wherein the one or more processing devices or components are further configured, individually or in combination, to not brake the spindle motor until both the first and the second actuators have been retracted and parked.

16. The method of claim 14, wherein the internal supply voltage is generated using at least one of:
   a synchronous rectification technique, wherein the synchronous rectification technique comprises rectifying the BEMF voltage to generate the internal supply voltage; and
   a boost/brake technique, wherein the boost/brake technique comprises periodically shorting windings of the spindle motor to boost the BEMF voltage.

17. The method of claim 14, wherein the at least one PLSI comprises a single PLSI having a lead driver and a support driver, the method further comprising:
   retracting and parking the first actuator, based on driving the first actuator using the lead driver; and
   retracting and parking the second actuator, based on driving the second actuator using the support driver.

18. The method of claim 14, wherein the at least one PLSI comprises a lead PLSI and a support PLSI, and wherein the first actuator comprises a lead actuator and the second actuator comprises a support actuator, the method further comprising:
   driving the lead actuator by the lead PLSI to retract and park the lead actuator; and
   driving the support actuator by the support PLSI to retract and park the support actuator.

19. The method of claim 18, wherein,
   the lead PLSI comprises a lead nINT pin that is coupled to a drain of a lead metal oxide semiconductor field effect transistor (MOSFET) and the support PLSI comprises a support nINT pin that is coupled to a drain of a support MOSFET, and
   the lead nINT pin and the support nINT pin are tied together;
   the method further comprising:
      pulling the lead nINT pin down to a low state when the lead PLSI is driving the lead actuator to retract and park in response to the EPO event;
      pulling the support nINT pin down to a low state when the support PLSI is driving the second actuator to retract and park in response to the EPO event; and
      releasing each of the lead nINT pin and the support nINT pin when both the lead actuator and the support actuator have been retracted and parked by the lead PLSI and the support PLSI, respectively, wherein the releasing causes the lead and support nINT pins to be pulled up to a high state.

20. A data storage device, comprising:
   a system on a chip (SoC);
   a first actuator;
   a second actuator;
   at least one power large scale integrated circuit (PLSI) configured to drive the first actuator and the second actuator;
   a spindle motor;
   means for actuating a first read-write head using the first actuator over a first disk of the data storage device;
   means for actuating a second read-write head using the second actuator over a second disk of the data storage device;
   means for rotating the first disk and the second disk using the spindle motor; and
   in response to an emergency power off (EPO) event,
      means for controlling the first actuator and the second actuator to retract and park using an internal supply voltage generated from a back electromotive force (BEMF) voltage of the spindle motor;
      means for controlling the spindle motor to brake;
      means for initiating data egress during the EPO event, based at least in part on the at least one PLSI communicating with the SoC; and
      means for egressing data to non-volatile memory, based at least in part on comparing the internal supply voltage to one or more egress throttling threshold voltages.

* * * * *